(12) United States Patent
Ohdachi et al.

(10) Patent No.: US 9,418,548 B2
(45) Date of Patent: Aug. 16, 2016

(54) DISPLAY CONTROL DEVICE, DISPLAY CONTROL METHOD, NON-TRANSITORY COMPUTER-READABLE RECORDING MEDIUM, AND PROJECTING DEVICE

(71) Applicant: Panasonic Intellectual Property Management Co., Ltd., Osaka (JP)

(72) Inventors: Eriko Ohdachi, Kanagawa (JP); Koichi Emura, Kanagawa (JP); Makoto Mochizuki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/730,213

(22) Filed: Jun. 3, 2015

(65) Prior Publication Data
US 2015/0367779 A1 Dec. 24, 2015

(30) Foreign Application Priority Data

Jun. 20, 2014 (JP) ................................. 2014-127328

(51) Int. Cl.
*G08G 1/0967* (2006.01)
*G09G 3/04* (2006.01)
*G08G 1/0962* (2006.01)

(52) U.S. Cl.
CPC ............ *G08G 1/0967* (2013.01); *G08G 1/0962* (2013.01); *G08G 1/09675* (2013.01); *G09G 3/04* (2013.01); *B60R 2300/80* (2013.01)

(58) Field of Classification Search
CPC .... G08G 1/0967; G08G 1/09675; G09G 3/04
See application file for complete search history.

(56) References Cited

U.S. PATENT DOCUMENTS 7,501,939 B1 * 3/2009 Belikov ................. B60K 35/00
340/438

9,153,156 B2 * 10/2015 Tomura ..................... G09G 3/04
2009/0195411 A1 8/2009 Ichihashi et al.
2011/0260850 A1 * 10/2011 Ringenwald ........... B60K 35/00
340/461
2014/0125562 A1 * 5/2014 Tomura ..................... G09G 3/04
345/52
2014/0125563 A1 * 5/2014 Tomura ..................... G09G 3/04
345/52

FOREIGN PATENT DOCUMENTS

JP 2004-348468 12/2004
JP 2009-187166 8/2009

OTHER PUBLICATIONS

The Extended European Search Report dated Oct. 22, 2015 for the related European Patent Application No. 15171025.8.

* cited by examiner

*Primary Examiner* — Van Trieu
(74) *Attorney, Agent, or Firm* — Greenblum & Bernstein, P.L.C.

(57) ABSTRACT

A display control device includes a controller that, if an obtainer obtains first-segment speed limit information, controls a displayer so that it creates a first predetermined image, indicating a first-segment speed limit, and displays the first predetermined image on a display medium, and includes a determiner that, if second-segment length information is obtained after the first-segment speed limit information has been obtained, determines whether the second-segment length is shorter than a threshold. The controller makes a switchover from control under which the displayer creates the first predetermined image and displays it on the display medium to control under which the displayer creates a second predetermined image, indicating a second-segment speed limit, and displays the second predetermined image on the display medium in different control ways depending on whether the second-segment length is shorter than the threshold.

17 Claims, 20 Drawing Sheets

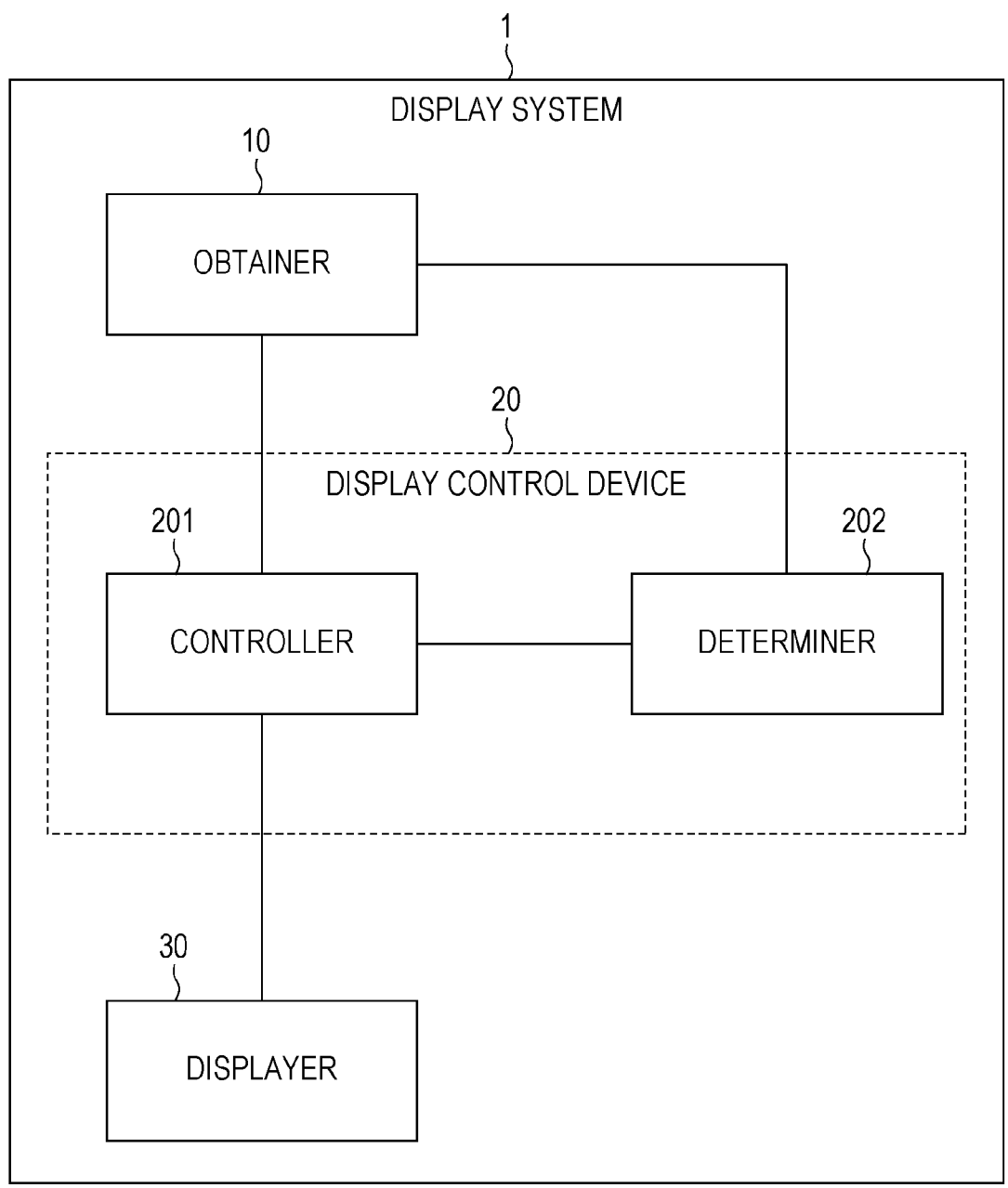

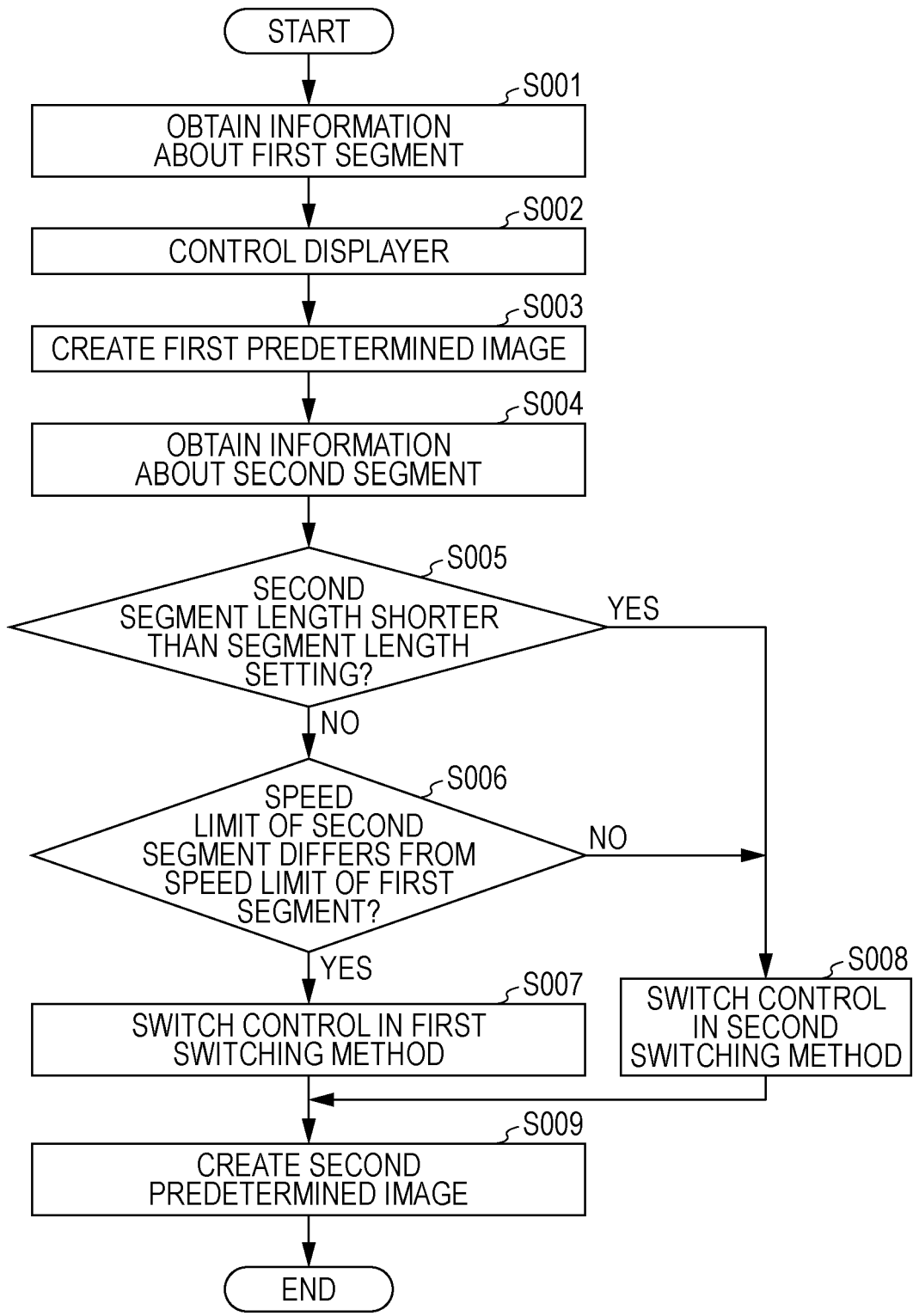

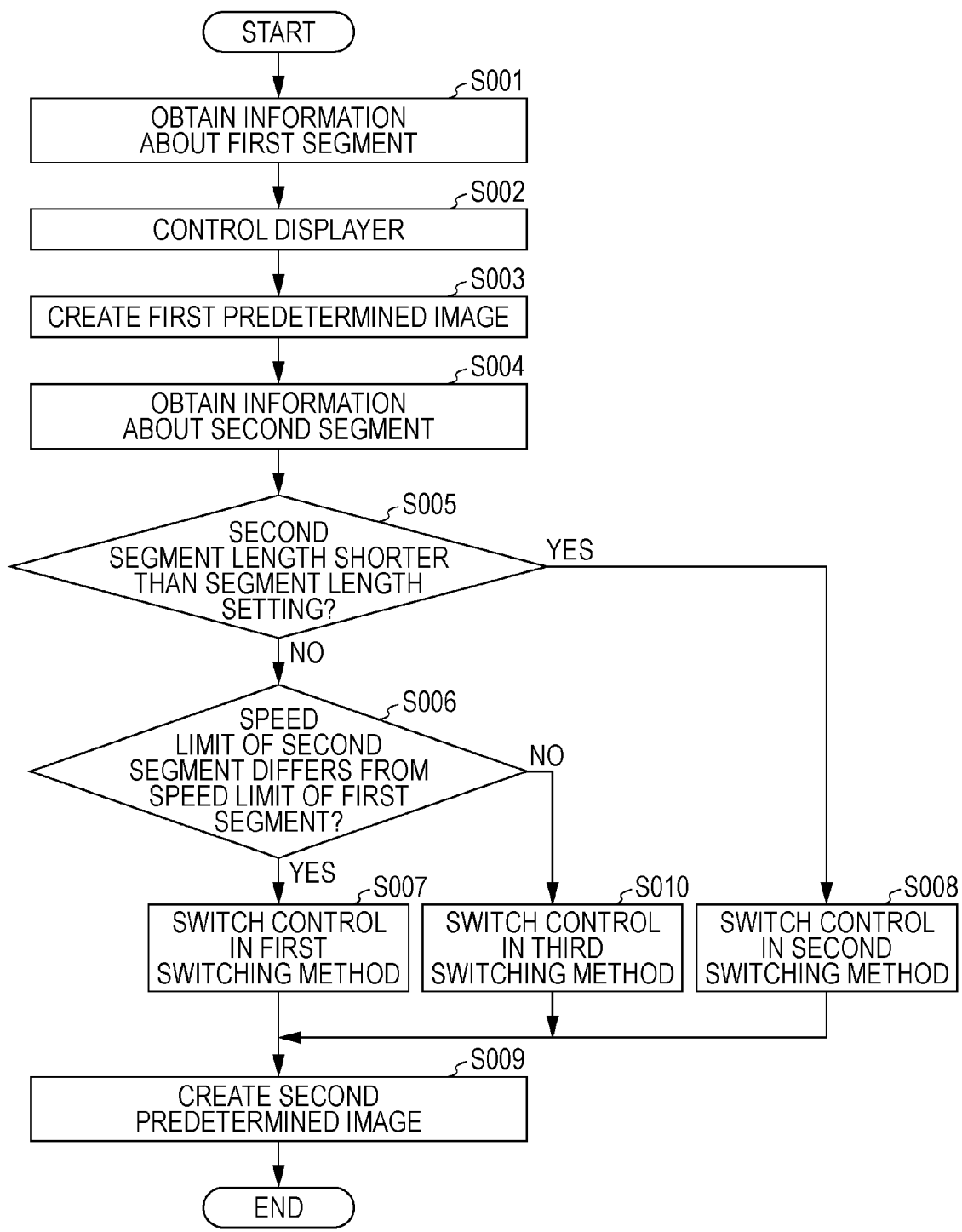

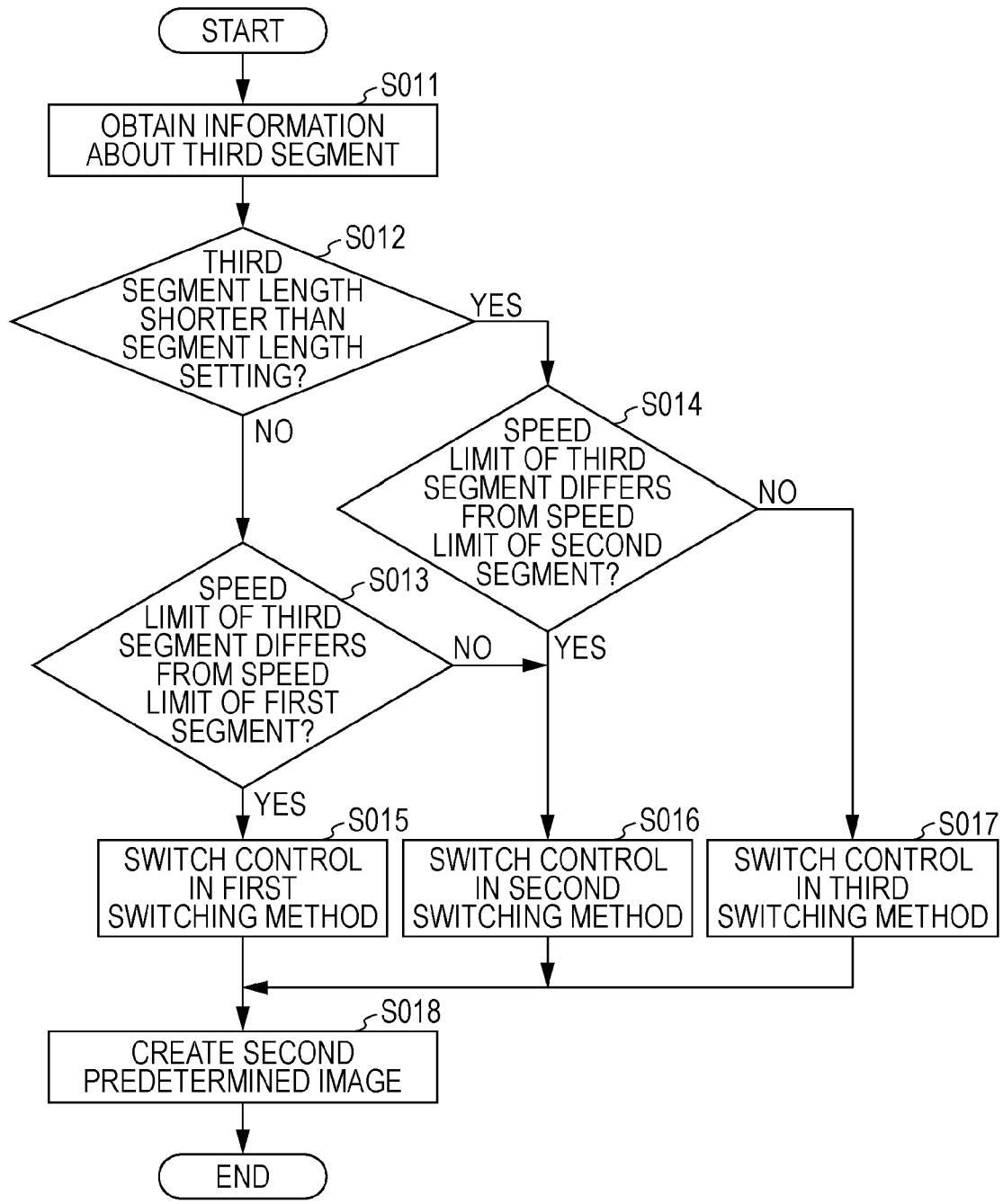

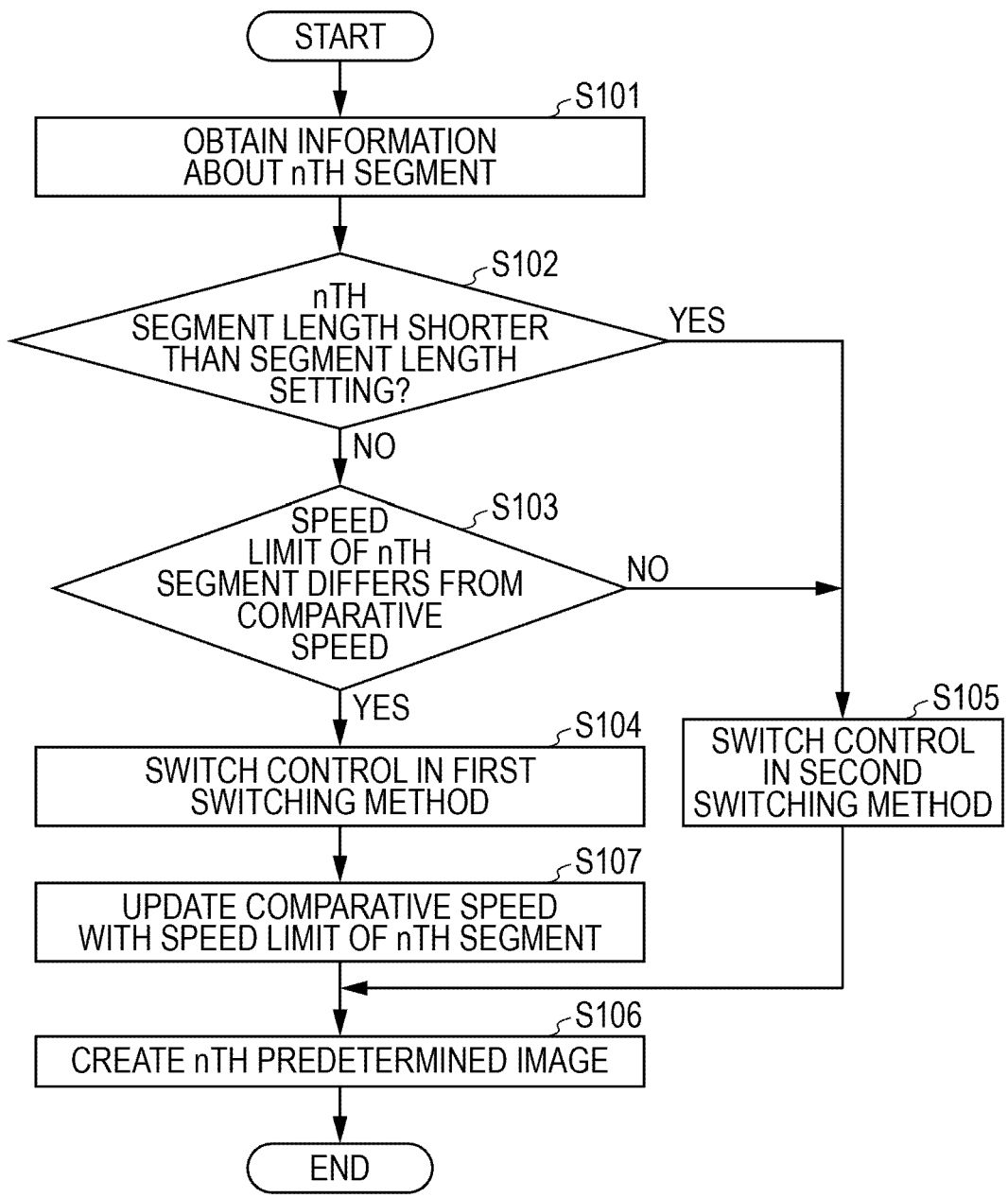

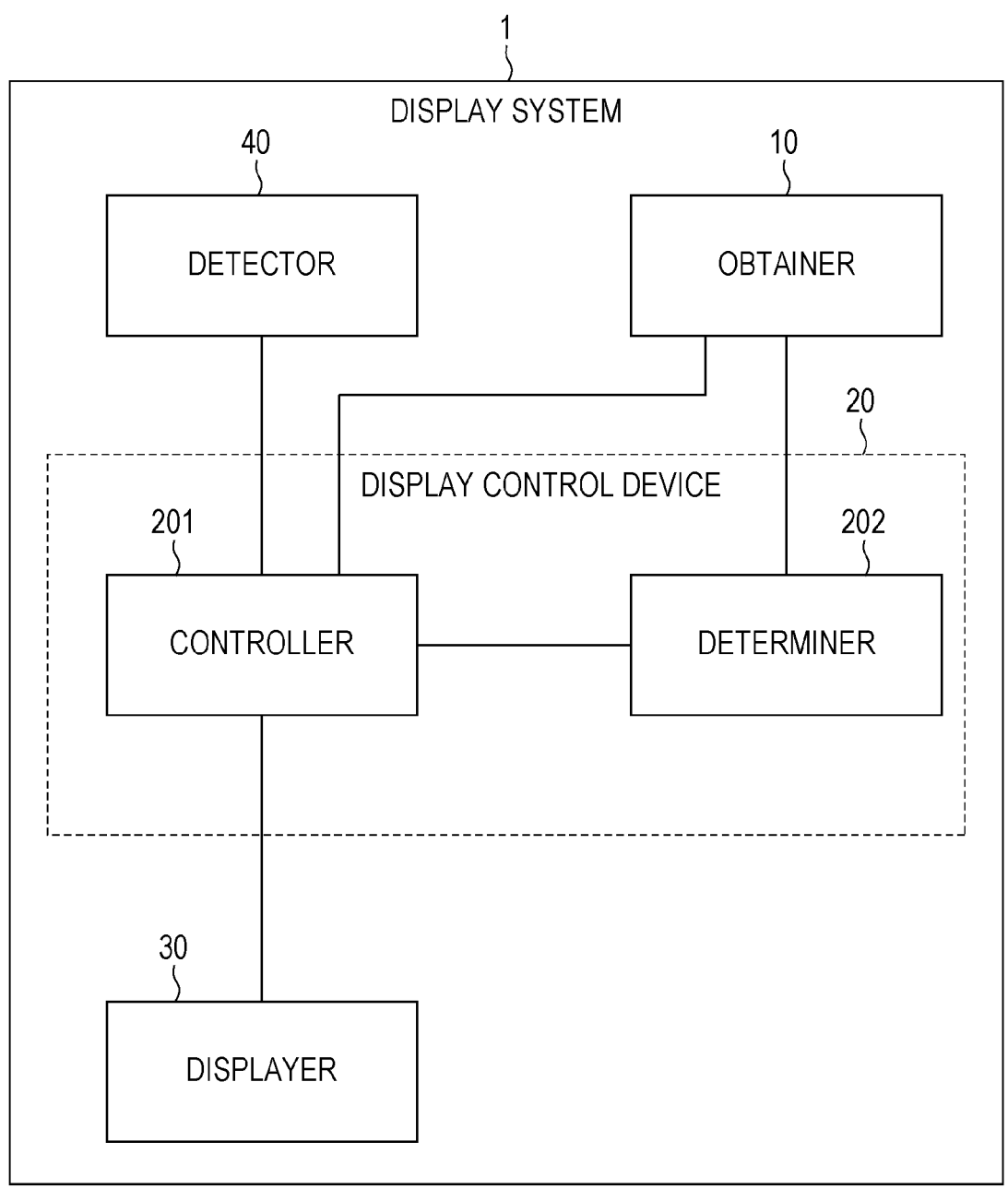

DISPLAY CONTROL DEVICE, DISPLAY CONTROL METHOD, NON-TRANSITORY COMPUTER-READABLE RECORDING MEDIUM, AND PROJECTING DEVICE

BACKGROUND

1. Technical Field

The present disclosure relates to a display control device, a display control method, a non-transitory computer-readable recording medium, and a projecting device that control the displaying of information provided to an occupant in a vehicle or the like.

2. Description of the Related Art

In recent years, the development of a driving assistance system has been pursued in which an image of a road sign or the like is obtained by a vehicle-mounted camera, information about the speed limit of the road on which the vehicle is travelling is obtained from the image, and an occupant is notified of the obtained speed limit information to prevent the speed limit from being exceeded. This type of drive assistance system is disclosed in, for example, Japanese Unexamined Patent Application Publication No. 2009-187166 (the drive assistance system will be referred to below as the related art).

In the related art, the speed limit of the lane on which the vehicle is travelling (the lane will be referred to below as the travelling lane) is identified, and an image representing the identified speed limit is superimposed on a map image displayed on a display medium. In the related art, the speed limit of an adjacent lane (lane adjacent to the travelling lane) is also identified and an image representing the identified speed limit of the adjacent line is superimposed on the map image displayed on the display medium. Thus, the driver of the vehicle can know the speed limit of each lane.

However, the related art has been problematic in the visibility of the speed limit information at the time of a switchover on the display medium between images indicating a speed limit.

SUMMARY

One non-limiting and exemplary embodiment provides a display control device, a display control method, a non-transitory computer-readable recording medium, and a projecting device that can improve the visibility of speed limit information displayed on a display medium.

In one general aspect, the techniques disclosed here feature a display control device in a display system that includes an obtainer that obtains information about the segment length of a segment of a road on which a vehicle travels and information about the speed limit of the segment and also includes a displayer that creates a predetermined image according to the information about the segment length and the information about the speed limit, which are obtained by the obtainer, and displays the predetermined image on a display medium. The display control device includes a controller that, if information about the speed limit of a first segment is obtained, controls the displayer so that it creates a first predetermined image, which represents a visual image indicating the speed limit of the first segment when the first predetermined image is displayed on the display medium, and displays the first predetermined image on the display medium, and also includes a determiner that, if information about a second-segment length, which is the segment length of a second segment, and information about the speed limit of the second segment are obtained after the information about the speed limit of the first segment has been obtained, determines whether the second-segment length is shorter than a pre-defined length, which has been pre-defined, and also determines whether the speed limit of the second segment differs from the speed limit of the first segment.

If the determiner determines that the segment length of the second segment is not shorter than the pre-defined length and that the speed limit of the second segment differs from the speed limit of the first segment, the controller makes a switchover, in first switching method performed as display switching method for the displayer, from control under which the displayer is caused to create the first predetermined image and display it on the display medium to control under which the displayer is caused to create a second predetermined image, which represents a visual image indicating the speed limit of the second segment when the second predetermined image is displayed on the display medium, and display the second predetermined image on the display medium. If the determiner determines that the segment length of the second segment is shorter than the pre-defined length, the controller makes a switchover, in second switching method, which differs from the first switching method, from control under which the displayer is caused to create the first predetermined image and display it on the display medium to control under which the displayer is caused to create the second predetermined image and display it on the display medium.

According to the present disclosure, the visibility of speed limit information displayed on a display medium can be improved.

It should be noted that general or specific embodiments may be implemented as a system, a method, an integrated circuit, a computer program, a recording medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a block diagram illustrating an example of the structure of a display system according to a first embodiment of the present disclosure;

FIG. 2 is a flowchart illustrating a first exemplary operation of the display system according to the first embodiment of the present disclosure;

FIG. 6 is a flowchart illustrating another example of the first exemplary operation of the display system according to the first embodiment of the present disclosure;

FIG. 10 is a flowchart illustrating another example of the second exemplary operation of the display system according to the first embodiment of the present disclosure;

FIG. 12 is a flowchart illustrating an exemplary operation other than the first and second exemplary operations of the display system according to the first embodiment of the present disclosure;

FIG. 19 is a block diagram illustrating an example of the structure of a display system according to a second embodiment of the present disclosure.

DETAILED DESCRIPTION

Figure 3A:
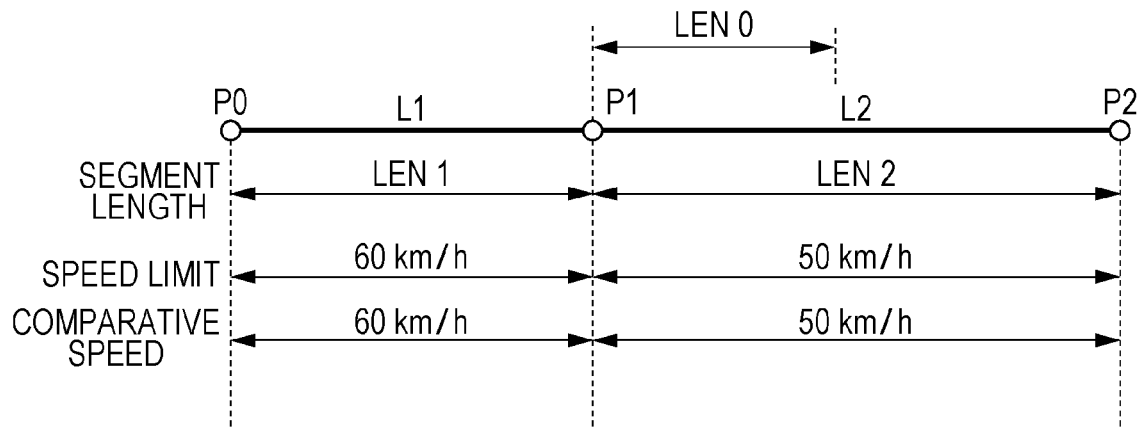
FIGS. 3A and 3B each illustrate an example of a first segment and a second segment according to the first embodiment of the present disclosure.

When a road segment on which a vehicle is travelling is switched in the conventional drive assistance system, a fixed manner is used to switch speed limit information displayed on a display medium to present the speed limit information to an occupant. This has been problematic in visibility; for example, the occupant may not notice a switchover of speed limit information at a necessary time, or may feel visually bothered with the switching of speed limit information when the switchover is not needed. First and second embodiments of the present disclosure addresses this problem by improving the visibility of speed limit information displayed on a display medium.

Here, the road segment is a segment of a road between intersections or a segment for each lane (vehicular lane). Alternatively, the road segment is, for example, a segment of a road in an area in which a speed limit has been predetermined. In the description below, an intersection or a boundary on a road in an area in which a speed limit has been predetermined will be referred to as a node, and a region between nodes will be referred to as a road link. In examples below, a road link is a road segment.

First Embodiment

A first embodiment of the present disclosure will be described with reference to the drawings.

First, an example of the structure of a display system 1 according to this embodiment will be described with reference to FIG. 1. FIG. 1 is a block diagram illustrating an example of the structure of the display system 1 according to this embodiment.

The display system 1 is used in, for example, a moving body such a vehicle to assist the operation of the vehicle. The display system 1 may be a vehicle-mounted device or a device that is brought in a vehicle. Although, in this embodiment, an example in which the user is an occupant in a vehicle, particularly, the driver of the vehicle will be described, this is not a limitation. In addition, the display system 1 may be used in a wearable computer (for example, a head-mounted display or helmet-mounted display (HMD), which will be described later, that the user can wear on the user's body.

In FIG. 1, the display system 1 includes an obtainer 10, a display control device 20, and a displayer 30. The display control device 20 includes a controller 201 and a determiner 202.

The obtainer 10 obtains information about a road segment on which a vehicle is travelling. Specifically, the obtainer 10 obtains segment length information and speed limit information at a predetermined timing. The segment length information indicates the distance of the road segment (for example, 50 m or 1.2 km). The speed limit information indicates the speed limit of the road segment (for example, 60 km/h or 50 km/h).

This embodiment assumes that, as an example, the segment length information and speed limit information have been mutually associated in advance for each segment included in map information and have been prestored in a predetermined storage device together with the map information. The predetermined storage device may be included in the display system 1 or may be a database provided outside the display system 1. The obtainer 10 obtains the segment length information and speed limit information from the predetermined storage device each time, for example, the road segment on which the vehicle is travelling is switched. To obtain the segment length information and speed limit information about the road segment on which the vehicle is travelling, the obtainer 10 may identify the road segment according to the map information and information obtained from the global positioning system (GPS) receiver mounted in the vehicle or brought in the vehicle. Alternatively, the obtainer 10 may obtain the segment length information and speed limit information about the road segment on which the vehicle is travelling from a facility installed on the road through wireless communication. In either case, a known technology can be used to implement a method of identifying the road segment on which the vehicle is travelling and a method of obtaining the segment length information and speed limit information about the identified segment, so their detailed explanation will be omitted.

The displayer 30 creates a predetermined image according to the information obtained by the obtainer 10 and displays the predetermined image on a display medium (not illustrated). Specifically, the displayer 30 creates an image according to control information in the controller 201 and projects the created image to the display medium. The display medium is, for example, a head-up display (HUD). In this case, the displayer 30 projects the predetermined image to the display medium so that the occupant in the vehicle recognizes it as a virtual image. In the present disclosure, the following description will assume that to project the predetermined image to the display medium so that the occupant recognizes it as a virtual image is synonymous with to display the predetermined image on the display medium. That is, in the following description, an event in which the predetermined image is projected to an HUD so that the occupant recognizes it as a virtual image will be referred to as a display.

The displayer 30 has, for example, a projector function and directly projects the created image to the HUD, which is a type of display medium. Thus, the image is displayed on the HUD. The displayer 30 may use, for example, the principle of holography to display a virtual image on the HUD, instead of using the projector function. When holography is employed, a method may also be used in which a light guiding plate that internally and totally reflects a parallel light flux group satisfying the internal total reflection condition for the light guide plate and guides the light. In the method in which a light guide plate is used, unlike a projector, image data is not directly projected. For convenience of explanation, however, the term projection or display is used as in the projector method.

The display medium is not limited to an HUD. For example, a liquid crystal display (LCD), a head-mounted display or helmet-mounted display (HMD), smart glasses, a display unit for use in navigation, a meter display unit, and other special display units are also applicable as the display medium. The HUD may be, for example, the windshield of the vehicle, or may be a glass plane or plastic plane that is provided separately. Instead of the windshield, a side window glass or the rear window glass of the vehicle, for example, may be used. In any case, an image is displayed on the display medium.

The controller 201 controls the displayer 30 so that when the obtainer 10 obtains information about an n-th (n is an integer larger than or equal to 1) road segment (referred to below as the n-th segment), the displayer 30 creates an n-th predetermined image, which represents a visual image indicating the speed limit of the n-th segment when the n-th predetermined image is displayed on the display medium, and displays the n-th predetermined image on the display medium. The above information about the n-th segment includes n-th-segment speed limit information indicating the speed limit of the n-th segment and n-th-segment length information indicating the segment length of the n-th segment (referred to below as the n-th-segment length).

The visual image indicating a speed limit may be an image that indicates only numeric information about the speed limit or may be an mage including numeric information about the speed limit like a road sign (see FIGS. 5A to 5C, which will be referenced later). The visual image indicating a speed limit is an image that is displayed on the display medium and is visually recognized by the occupant in the vehicle. The n-th predetermined image is an image created by the displayer 30. That is, the n-th predetermined image and the visual image, displayed on the display medium, that indicates a speed limit have essentially the same content.

A first segment and a second segment will be taken below as an example. If the obtainer 10 obtains information about the first segment and then obtains information about the second segment, the determiner 202 determines whether the second-segment length is shorter than a segment length setting (pre-defined length) and determines whether the speed limit of the second segment differs from the speed limit of the first segment. The information about the second segment includes the second-segment speed limit information indicating the speed limit of the second segment and second-segment length information indicating the second-segment. The segment length setting (pre-defined length) is a value that has been set in advance as a threshold used to determine whether the road segment length is shorter or longer than the segment length setting; the segment length setting is, for example, 30 m.

If the determiner 202 determines that the second-segment length is not shorter than the segment length setting and that the speed limit of the second segment differs from the speed limit of the first segment, the controller 201 makes a switchover, in a pre-defined first switching method, from control under which the displayer 30 is caused to create a first predetermined image and display it on the display medium to control under which the displayer 30 is caused to create a second predetermined image, which represents a visual image indicating the speed limit of the second segment when the second predetermined image is displayed on the display medium, and display the second predetermined image on the display medium.

If the determiner 202 determines that the second-segment length is shorter than the pre-defined length, the controller 201 makes a switchover, in a second switching method, which differs from the first switching method, from control under which the displayer 30 is caused to create the first predetermined image and display it on the display medium to control under which the displayer 30 is caused to create the second predetermined image and display it on the display medium.

To control the displayer 30, the controller 201 outputs to the displayer 30 a command to make a control switchover described above and control information indicating the content of switched-to control.

The display system 1 may be structured so as to include the display medium described above. In the display system 1, a combination of the display control device 20 and displayer 30 may be structured as the projecting device.

The predetermined images are each an image the design of which has been determined in advance. The predetermined image may be, for example, a road sign indicating a speed limit or an image that represents speed limit information as a digital display on a seven-segment display unit or the like.

The first predetermined image or second predetermined image may be created by the display control device 20 or another constituent element (not illustrated) rather than the displayer 30.

The first predetermined image or second predetermined image created in the display system 1 is visually recognized as a virtual image by, for example, the driver. In this case, the first predetermined image or second predetermined image may be projected to the display medium so that the image is superimposed in the field of vision of the driver. The principle in which the image projected to the display medium is visually recognized by the driver is a known technology, so its explanation will be omitted.

This completes the description of the exemplary structure of the display system 1 according to this embodiment.

Next, a first exemplary operation of the display system 1 according to this embodiment will be described with reference to FIG. 2. FIG. 2 is a flowchart illustrating the first exemplary operation of the display system 1 according to this embodiment. FIG. 2 illustrates a processing flow in the display system 1 in a case in which a vehicle travels on the first segment and then enters the second segment. The obtainer 10 obtains information (segment length information and speed limit information) about a switched-to road segment each time the road segment on which the vehicle is travelling is switched. In the flow in FIG. 2, information about the second segment before a switchover is made is handled information about the first segment after the switchover has been made, and processing in S004 and later is performed. The description below will assume that the road link and road segment has the same meaning.

Figure 3B:
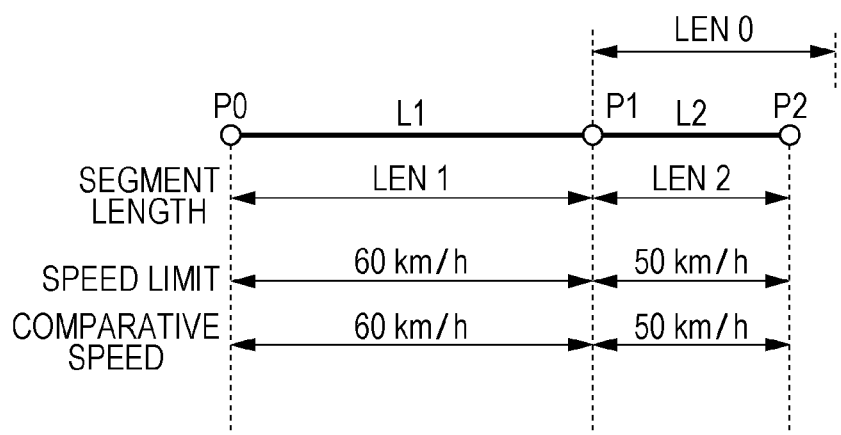

First, the obtainer 10 obtains information about the first segment (step S001). The information, about the first segment, referred to here is, for example, information about a road link L1 between a node P0 and a node P1 illustrated in FIGS. 3A and 3B. The information about the road link L1 is obtained when the road link on which the vehicle is travelling is switched to the road link L1. The information about the road link L1 includes first-segment length information and first-segment speed limit information. As an example, it will be assumed here that the speed limit of the first segment indicated by the first-segment speed limit information is 60 km/h as illustrated in FIGS. 3A and 3B. The second-segment length is the segment length LEN1 of the road link L1 in FIGS. 3A and 3B. The comparative speed in FIGS. 3A and 3B will be described later in a second exemplary operation.

Next, the controller 201 controls the displayer 30 according to the first-segment speed limit information so that the displayer 30 creates the first predetermined image, which represents a visual image indicating the speed limit (for example, 60 km/h) of the first segment when the first predetermined image is displayed on the display medium (step S002). The visual image referred to here is a first visual image 101 illustrated in FIGS. 5A to 5C, which will be referenced later.

Next, the displayer 30 creates the first predetermined image under control of the controller 201 and displays the first predetermined image on the display medium (step S003).

Next, the obtainer 10 obtains information about the second segment (step S004). The information, about the second segment, referred to here is, for example, information about a road link L2 between the node P1 and a node P2 illustrated in FIGS. 3A and 3B. The information about the road link L2 is obtained when the road link on which the vehicle is travelling is switched to the road link L2. The information about the road link L2 includes second-segment length information and second-segment speed limit information. As an example, it will be assumed here that the speed limit of the second segment indicated by the second-segment speed limit information is 50 km/h as illustrated in FIGS. 3A and 3B. That is, it will be assumed here that the speed limit of the second segment differs from the speed limit of the first segment.

There is an essential match between a first timing at which the road on which the vehicle is travelling is switched from the road link L1 to the road link L2 and a second timing at which the first predetermined image disappears from the display medium. That is, it is preferable to make a match between the first timing and the second timing. However, the first timing and second timing may not necessarily match because, for example, there is a processing time delay caused by the display control device 20. The second timing may be earlier than or later than the first timing; they do not restrict the range of the present disclosure.

Next, the determiner 202 determines whether the second-segment length is shorter than the segment length setting (step S005). The second-segment length referred to here is the segment length LEN2 of the road link L2 in FIGS. 3A and 3B. The segment length setting is a segment length setting LEN0 illustrated in FIGS. 3A and 3B.

If the determination result in step S005 above indicates that the second-segment length is not shorter than the segment length setting (the result in step S005 is No), the flow proceeds to step S006.

Figure 4A:
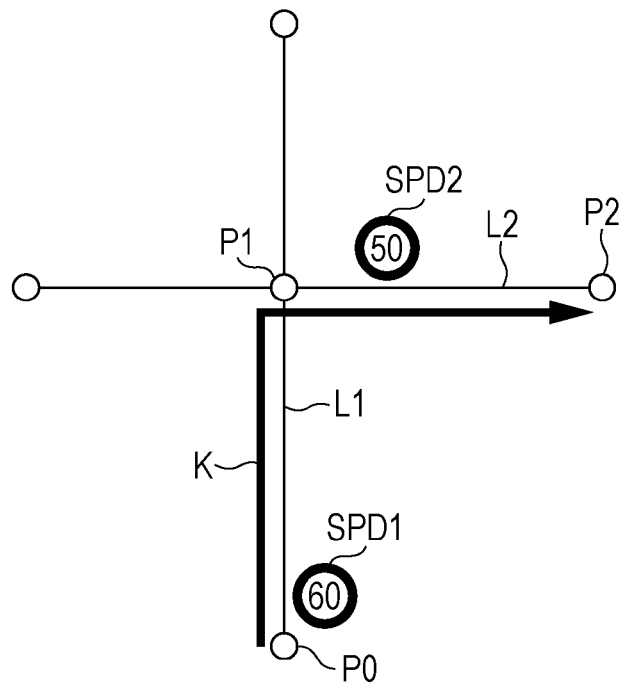
FIGS. 4A and 4B each illustrate an example in which a vehicle is travelling from the first segment to the second segment according to the first embodiment of the present disclosure.

FIG. 3A, for example, indicates a case in which the segment length LEN2 of the road link L2 is not shorter than the segment length setting LEN0. FIG. 4A illustrates a travelling example of the vehicle in this case. In FIG. 4A, the road link L1, on which the speed limit SPD1 of the first segment is 60 km/h, and the road link L2, on which the speed limit SPD2 of the second segment is 50 km/h, are mutually connected at the node P1. The vehicle travels on the road link L1, turns to the right at the node P1, and travels on the road link L2, as indicated by the arrow K. In this case, control is performed in step S006, which will be described later, so that the driver can easily recognize a switchover between speed limits.

If the determination result in step S005 above indicates that the second-segment length is shorter than the segment length setting (the result in step S005 is Yes), the flow proceeds to step S008. In a case as well in which the determination result in step S006, which will be described later, indicates that the speed limit of the second segment matches the speed limit of the first segment (the result in step S006 is No), the flow proceeds to step S008.

Figure 4B:
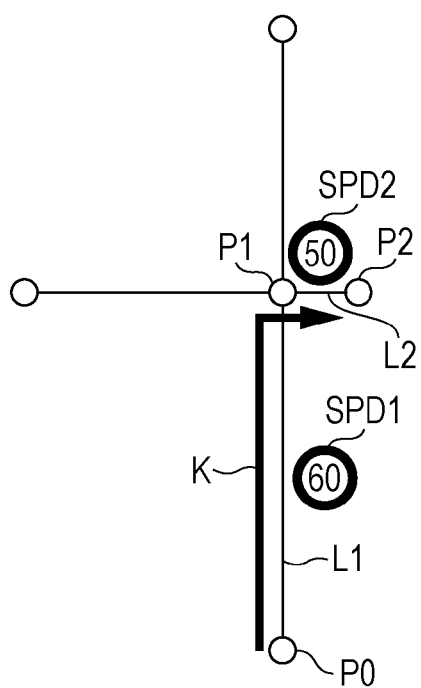

FIG. 3B, for example, indicates a case in which the segment length LEN2 of the road link L2 is shorter than the segment length setting LEN0. FIG. 4B illustrates a travelling example of the vehicle in this example. In FIG. 4B, the road link L1, on which the speed limit SPD1 of the first segment is 60 km/h, and the road link L2, on which the speed limit SPD2 of the second segment is 50 km/h, are mutually connected at the node P1. The vehicle travels on the road link L1, turns to the right at the node P1, and travels on the road link L2, as indicated by the arrow K. In this case, control is performed in step S008, which will be described later, so that the driver is not visually bothered with a switchover between speed limits. When a speed limit is changed, it is desirable to make the driver recognize the change. If, however, road segments are short, the driver is frequently notified of a change in speed limit. This is problematic in that the driver is bothered. To avoid this problem, the above control is performed.

In a case as well in which the second-segment length is not shorter than the segment length setting (the result in step S005 is No) and the speed limit of the second segment matches the speed limit of the first segment (the result in step S006 is No), control is performed so that the driver is not visually bothered with a switchover between speed limits. This is to avoid the problem that even when the second-segment length is not shorter than the segment length setting, if the speed limit of the second segment matches the speed limit of the first segment, there is no change in speed limit, in which case if the driver is noticeably notified of this change, the driver is bothered.

As described above, if the determiner 202 determines in step S005 that the second-segment length is not shorter than the segment length setting (the result in step S005 is No), the determiner 202 then determines whether the speed limit of the second segment differs from the speed limit of the first segment (step S006). If the determination result indicates that the speed limit of the second segment differs from the speed limit of the first segment (the result in step S006 is Yes), the flow proceeds to step S007.

Next, if the determiner 202 determines that the second-segment length is not shorter than the segment length setting (the result in step S005 is No) and that the speed limit of the second segment differs from the speed limit of the first segment (the result in step S006 is Yes), the controller 201 makes a switchover, in the pre-defined first switching method, from control under which the displayer 30 is caused to create the first predetermined image and display it on the display medium to control under which the displayer 30 is caused to create the second predetermined image, which represents a visual image indicating the speed limit of the second segment when the second predetermined image is displayed on the display medium, and display the second predetermined image on the display medium (step S007).

The second predetermined image is an image that represents a visual image indicating the speed limit of the second segment (for example, 50 km/h) when the second predetermined image is displayed on the display medium. The visual image referred to here is, for example, a second visual image 102 illustrated in FIGS. 5A to 5C, which will be referenced later. An example in which control is switched in the first switching method will be described later with reference to FIG. 5A.

If the determiner 202 determines that the second-segment length is shorter than the segment length setting (the result in step S005 is Yes), the controller 201 makes a switchover, in the second switching method, which differs from the first switching method, from control under which the displayer 30 is caused to create the first predetermined image and display it on the display medium to control under which the displayer 30 is caused to create the second predetermined image and display it on the display medium (step S008).

If the determiner 202 determines that the second-segment length is not shorter than the segment length setting and that the speed limit of the second segment matches the speed limit of the first segment, the controller 201 makes a switchover, in the second switching method, from control under which the displayer 30 is caused to create the first predetermined image and display it on the display medium to control under which the displayer 30 is caused to create the second predetermined image and display it on the display medium (step S008).

An example in which control is switched in the second switching method will be described later with reference to FIGS. 5B and 5C.

In steps S007 and S008, the controller 201 outputs to the displayer 30 a command to make a control switchover and control information indicating the content of switched-to control.

Next, the displayer 30 creates the second predetermined image according to the control information received from the controller 201 and projects the second predetermined image to the display medium (step S009).

Although an example in which the vehicle turns to the right at an intersection has been illustrated in FIGS. 4A and 4B, this is not a limitation; it suffices that a relationship between the segment lengths and speed limits of the first segment and second segment is obtained as described above. Without being limited to a case in which the vehicle turns to the right or left at an intersection, a case in which the vehicle goes straight and passes the intersection is also applicable.

Next, specific examples in which control (an image displayed on the display medium) is switched in the first switching method and second switching method in steps S007 and S008 in FIG. 2 will be described with reference to FIGS. 5A to 5C.

Figure 5A:
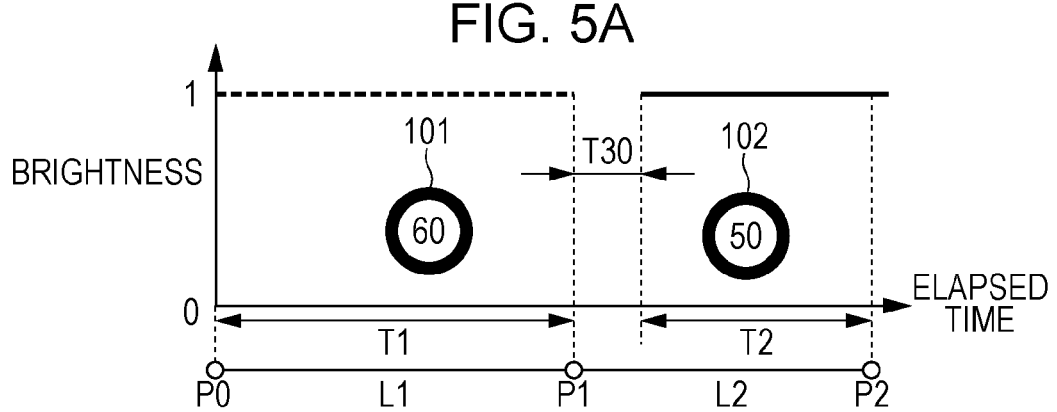
FIGS. 5A to 5C each illustrate a specific example of image display switching according to the first embodiment of the present disclosure.
Figure 5B:
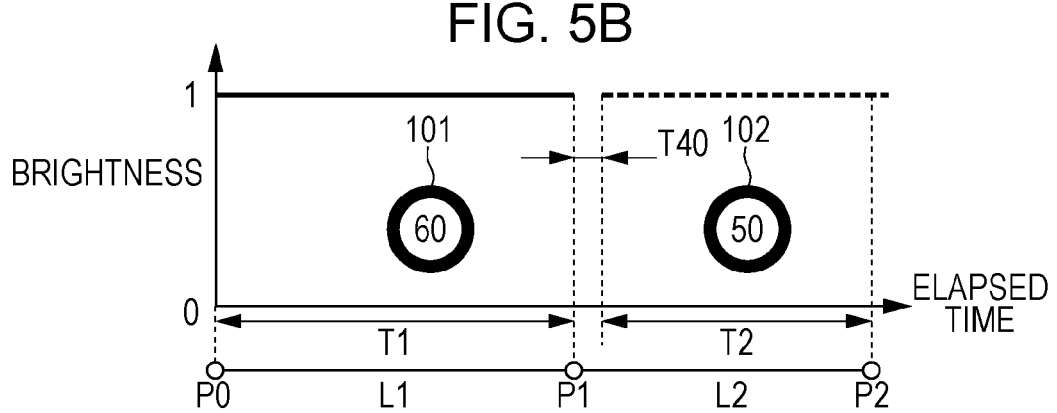
Figure 5C:
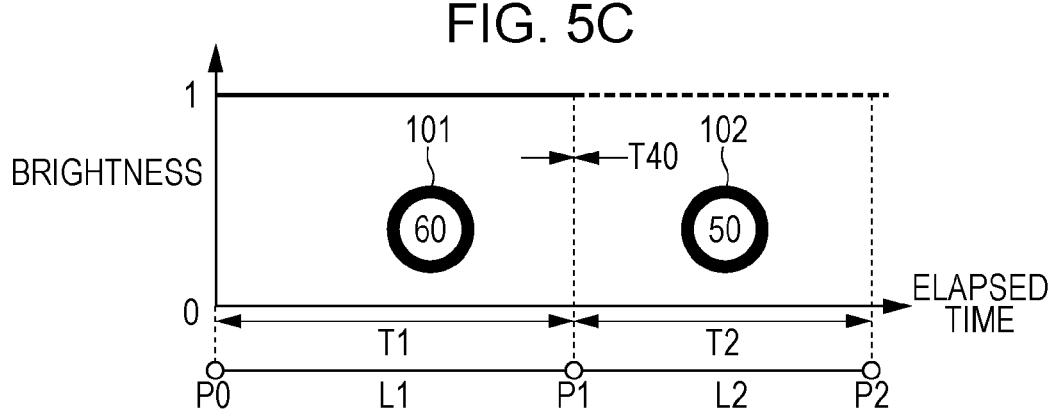

In FIGS. 5A to 5C, the brightness of a predetermined image, which has been described above, displayed on the display medium is indicated on the vertical axis, the brightness being a value relative to an arbitrary value, and a time during which the predetermined image is displayed on the display medium is indicated on the horizontal axis. The nodes P0 to P2 and road links L1 and L2 in FIGS. 5A to 5C are the same as in FIGS. 3A and 3B and FIGS. 4A and 4B. Time T1 is a time during which the first visual image 101 indicating the speed limit of the first segment (for example, 60 km/h) is displayed on the display medium. Time T2 is a time during which the second visual image 102 indicating the speed limit of the second segment (for example, 50 km/h) is displayed on the display medium.

The first visual image 101 and second visual image 102 in FIGS. 5A to 5C are each, for example, a road sign image on which a speed limit is indicated at the center. When the display medium is an HUD, the first visual image 101 and second visual image 102 are recognized as virtual images by the occupant.

As illustrated in FIGS. 5A to 5C, the first switching method is, for example, a method in which the controller 201 stops control under which the displayer 30 is caused to create the first predetermined image and display it on the display medium, and after the elapse of a first time, the controller 201 starts control under which the displayer 30 is caused to create the second predetermined image and display it on the display medium. The second switching method is, for example, a method in which the controller 201 stops control under which the displayer 30 is caused to create the first predetermined image and display it on the display medium, and after the elapse of a second time, the controller 201 starts control under which the displayer 30 is caused to create the second predetermined image and display it on the display medium. The second time is 0 or more but shorter than the first time.

Specific examples will be described below with reference to FIGS. 5A to 5C. FIG. 5A illustrates a specific example in which is control is switched in the first switching method. FIGS. 5B and 5C each illustrate a specific example in which is control is switched in the second switching method.

First, a specific example in which is control is switched in the first switching method will be described with reference to FIG. 5A. The example in FIG. 5A illustrates control switching that occurs when the determiner 202 determines that the second-segment length is not shorter than the segment length setting.

During time T1, the controller 201 controls the displayer 30 so that it creates the first predetermined image, which represents the first visual image 101 when the first predetermined image is displayed on the display medium, and displays the first predetermined image on the display medium at a predetermined brightness. Thus, the first visual image 101 is displayed on the display medium.

Then, when the vehicle enters the road link L2, if the determiner 202 determines that the second segment length LEN2 is not shorter than the segment length setting LEN0 and that the speed limit of the second segment differs from the speed limit of the first segment, the controller 201 controls the displayer 30 so that it stops the displaying of the first visual image 101 on the display medium by stopping the creation of the first predetermined image representing the first visual image 101. Thus, when the vehicle enters the road link L2, the first visual image 101 is not displayed on the display medium.

The controller 201 then controls the displayer 30 so that after the elapse of a pre-defined first time T30 (for example, 0.5 or 1 second), the displayer 30 creates the second predetermined image, which represents the second visual image 102 when the second predetermined image is displayed on the display medium, and displays the second predetermined image on the display medium at a predetermined brightness (for example, the same brightness as the brightness of the first visual image 101). Thus, the second visual image 102 is displayed on the display medium. The controller 201 may control the displayer 30 so that it reads out the second predetermined image representing the second visual image 102 created in advance from a predetermined storage device and displays the second predetermined image at the predetermined brightness.

As described above, if the second-segment length is not shorter than the segment length setting and the speed limit of the second segment differs from the speed limit of the first segment, the second visual image 102 is displayed after the elapse of the pre-defined first time T30 from when the display of the first visual image 101 has disappeared. Therefore, image switching becomes more outstanding, so the driver can easily recognize an image switchover. Even if, for example, the driver is not gazing at the display medium, the driver can notice an image switchover in, for example, the peripheral vision.

Next, a specific example in which is control is switched in the second switching method will be described with reference to FIG. 5B. The example in FIG. 5B illustrates control switching that occurs when the determiner 202 determines that the second-segment length is shorter than the segment length setting.

The example in FIG. 5B differs from the example in FIG. 5A in that a second time T40 is applied instead of the first time T30. The other points are the same as in FIG. 5A, so their description will be omitted here. Time T40, which has been pre-defined, is 0 or more but shorter than time T30.

It is generally said that the critical flicker frequency (CFF), which is the threshold frequency in contrast that a human can perceive, is 30 to 40 Hz. It suffices for time T40 to be set to a value of, for example, 20 ms or less, according to this CFF. Alternatively, as illustrated in FIG. 5C, by setting time T40 to zero, a switchover from the first visual image 101 to the second visual image 102 may be immediately made. Then, the driver is less likely to feel bothered with a switchover between images.

As described above, if the second-segment length is shorter than the segment length setting or if the second-segment length is not shorter than the segment length setting and the speed limit of the second segment matches the speed limit of the first segment, the second visual image 102 is displayed on the display medium after the elapse of the pre-defined time T40 from when the display of the first visual image 101 has disappeared. Accordingly, image switching does not become outstanding when compared with a case in which the second-segment length is not shorter than the segment length setting and the speed limit of the second segment differs from the speed limit of the first segment, so the driver is less likely to feel bothered with a switchover between images.

In the above description, if the second-segment length is shorter than the segment length setting and the speed limit remains unchanged even after a switchover between the road links, control has switched in the second switching method. In the second switching method, a case in which the second time T40 is set to zero is also applicable. With T40 set to zero, although the controller 201 switches data processing from the displaying of the speed limit information corresponding to the road link L1 to the displaying of the speed limit information corresponding to the road link L2, it is recognized by the user that the display has not been essentially switched. Thus, when time T40 is set to zero, the driver has almost no visual botheration.

As illustrated in FIG. 6, if the second-segment length is not shorter than the segment length setting (the result in step S005 is No) and the speed limit remains unchanged even after a switchover between the road links (the result in S006 is No), control may be switched in a third switching method (step S010), which differs from the first switching method and second switching method. That is, the switching method used may differ depending on whether the second-segment length is shorter than the segment length setting (step S008) or the second-segment length is not shorter than the segment length setting (the result in step S005 is No) and the speed limit remains unchanged even after a switchover between the road links (the result in S006 is No). Specifically, the third switching method is the same as the switching method used when time T40 is zero or more but less than T30, but the third switching method is used when time T40 is zero. That is, in the third switching method, the controller 201 only switches data processing from the displaying of the speed limit information corresponding to the road link L1 to the displaying of the speed limit information corresponding to the road link L2, so it is recognized by the driver, who is the user, that the display has not been essentially switched. In other words, when control is switched in the third switching method, the visual image displayed on the display medium remains unchanged before and after control is switched. As described above, since the second visual image 102 is displayed after the elapse of essentially zero time from when the first visual image 101 has disappeared, the driver has almost no visual botheration.

In the above description, if the determiner 202 determines that the second-segment length is shorter than the segment length setting, control has been switched in the second switching method. However, this is not a limitation. That is, control may be switched in the second switching method if the determiner 202 determines that the second-segment length is shorter than the segment length setting and that the speed limit of the second segment differs from the speed limit of the first segment and in the third control method if the determiner 202 determines that the second-segment length is shorter than the segment length setting and that the speed limit of the second segment matches the speed limit of the first segment. In the third switching method, it is recognized by the driver that switching has not occurred.

It is desirable that there be an essential match between a point in time at which the road link on which the vehicle is travelling is switched from the road link L1 to the road link L2 and a point in time at which the display of the speed limit is switched. This is because the driver can be notified in real time that the speed limit information has changed. In the present disclosure, however, a match is not necessarily required between a point in time at which the road link on which the vehicle is travelling is switched from the road link L1 to the road link L2 and a point in time at which the display of the speed limit is switched. A delay or an advance of a certain time is allowed and it does not restrict the range of the present disclosure. This is also true for other specific examples (illustrated in, for example, FIGS. 13A to 17B) described later.

This completes the explanation of the first exemplary operation of the display system 1 according to this embodiment.

Figure 7:
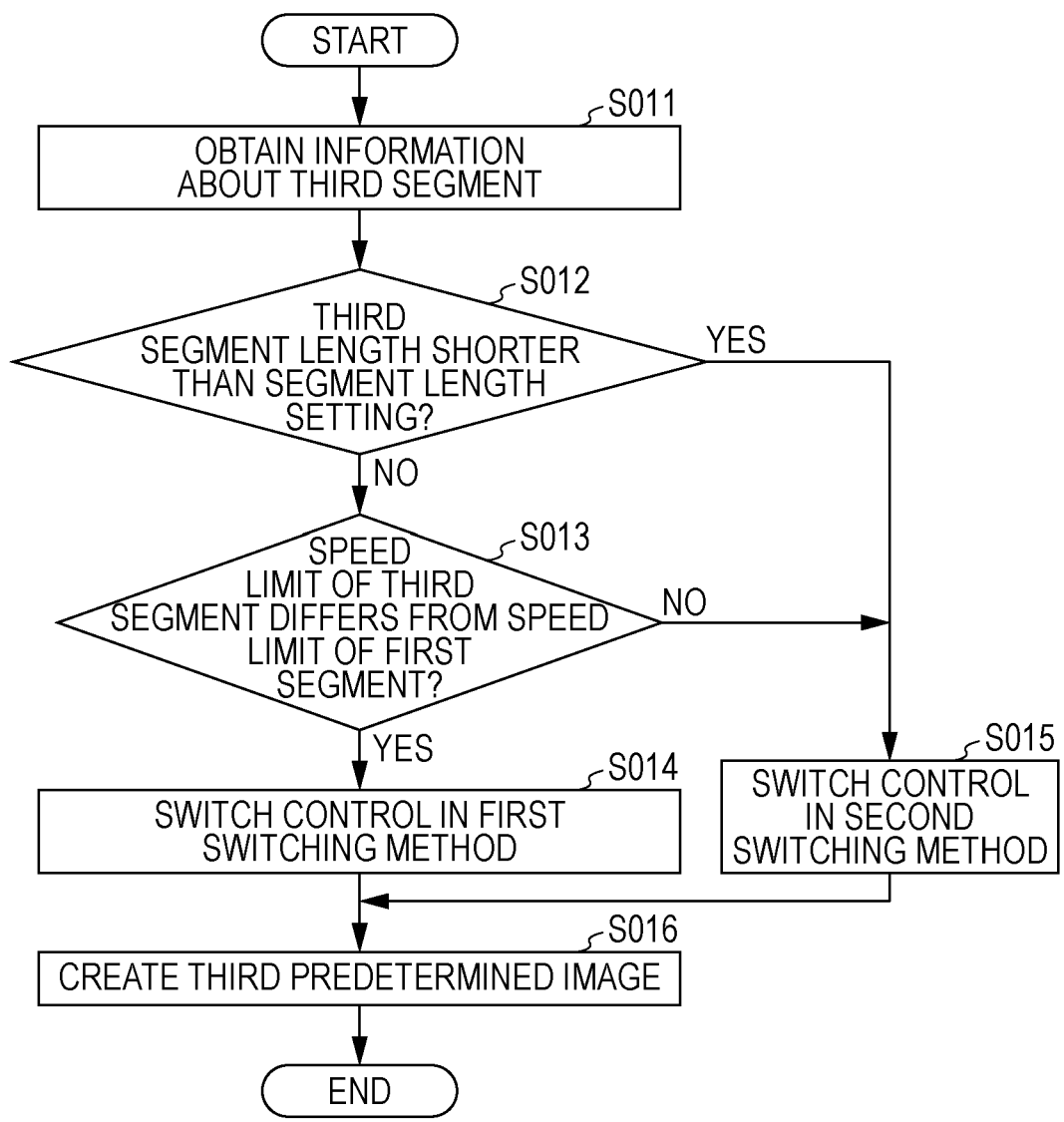
FIG. 7 is a flowchart illustrating a second exemplary operation of the display system according to the first embodiment of the present disclosure.

Next, a second exemplary operation of the display system 1 according to this embodiment will be described with reference to FIG. 7. FIG. 7 is a flowchart illustrating the second exemplary operation of the display system 1 according to this embodiment. The flow in FIG. 7 is executed when the road segment on which the vehicle is travelling is switched. For example, the flow in FIG. 7 is a processing flow of the display system 1 in a case in which a vehicle enters a third segment (third road segment) from the second segment. In the description below, a case in which a road segment is a road link will be taken as an example, as in the first exemplary operation in FIG. 2. Processing after steps S008 and S009 in FIG. 2 will be described below as an example.

The second exemplary operation of the display system 1 according to this embodiment is an exemplary operation after control has been switched in the second switching method in the first exemplary operation. After control has been switched in the second switching method in the first exemplary operation, the first exemplary operation is repeated.

In second exemplary operation of the display system 1 according to this embodiment, if control is switched in the second switching method and then the obtainer 10 obtains information about a third-segment length, which is the segment length of the third segment, and the speed limit of the third segment, the determiner 202 determines whether the third-segment length is shorter than the segment length setting. If the determiner 202 determines that the third-segment length is not shorter than the segment length setting, the determiner 202 also decides whether the speed limit of the third segment differs from the speed limit of the first segment. If the determiner 202 determines that the speed limit of the third segment differs from the speed limit of the first segment, the controller 201 makes a switchover, in the first switching method, from control under which the displayer 30 is caused to create the second predetermined image and display it on the display medium to control under which the displayer 30 is caused to create a third predetermined image, which represents a visual image indicating the speed limit of the third segment when the third predetermined image is displayed on the display medium, and display the third predetermined image on the display medium. This processing will be specifically described below.

Figure 8A:
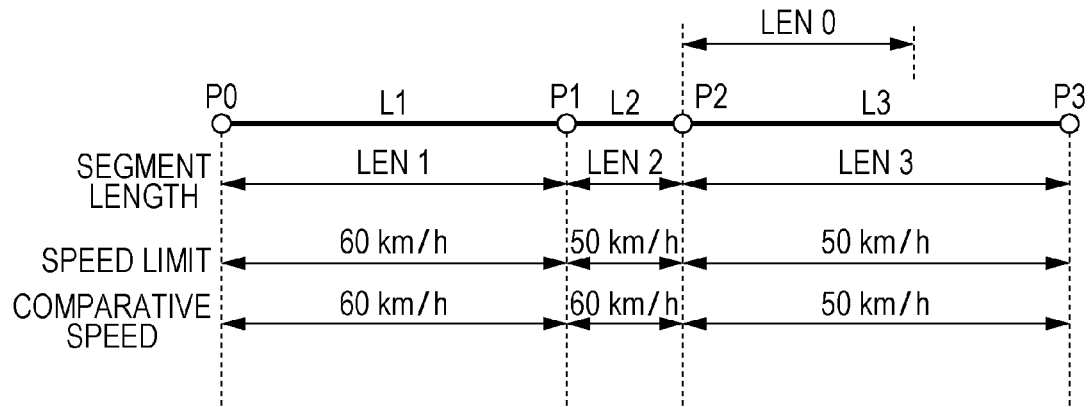
FIGS. 8A and 8B each illustrate an example of a third segment according to the first embodiment of the present disclosure.
Figure 8B:
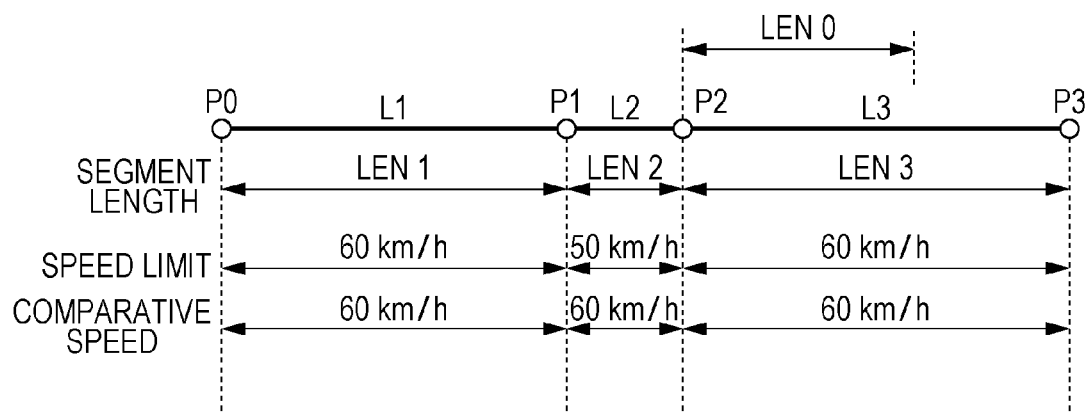

First, after control has been switched in the second switching method in the first exemplary operation described above, the obtainer 10 obtains information about the third segment (step S011). The information, about the third segment, referred to here is, for example, information about a road link L3 between the node P2 and a node P3, as illustrated in FIGS. 8A and 8B. The information about the road link L3 is obtained when the road link on which the vehicle is travelling is switched to the road link L3. The information about the road link L3 includes third-segment length information, which indicates the segment length of the third road segment (third-segment length), and third-segment speed limit information, which indicates the speed limit of the third road segment.

Next, the determiner 202 determines whether the third-segment length is shorter than the segment length setting (step S012). The third-segment length referred to here is the segment length LEN3 of the road link L3 in FIGS. 8A and 8B. The segment length setting is the segment length setting LEN0 illustrated in FIGS. 8A and 8B. Both FIGS. 8A and 8B illustrate a case in which the third-segment length is not shorter than the segment length setting.

If the determination result in step S012 above indicates that the third-segment length is not shorter than the segment length setting (the result in step S012 is No), the flow proceeds to step S013. If the determination result in step S012 above indicates that the third-segment length is shorter than the segment length setting (the result in step S012 is Yes), the flow proceeds to step S015.

If the determiner 202 determines in step S012 above that the third-segment length is not shorter than the segment length setting (the result in step S012 is No), the determiner 202 then determines whether the speed limit of the third segment differs from the speed limit of the first segment (step S013). As an example, it will be assumed here that the speed limit of the road link L1 has been set to 60 km/h (see FIGS. 8A and 8B).

Figure 9A:
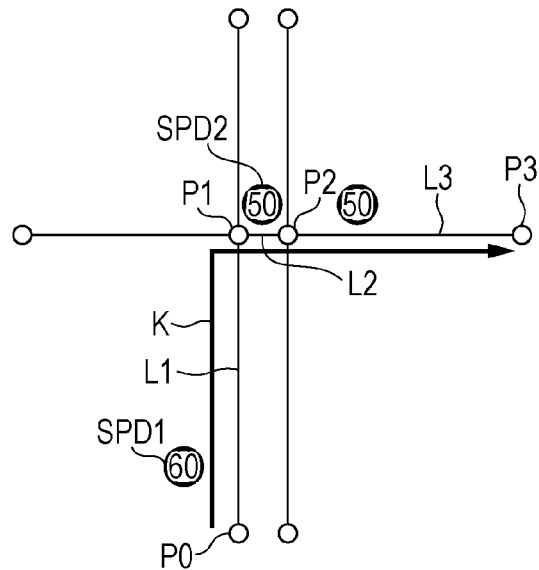
FIGS. 9A to 9D each illustrate an example in which the vehicle is travelling from the first segment to the third segment according to the first embodiment of the present disclosure.
Figure 9C:
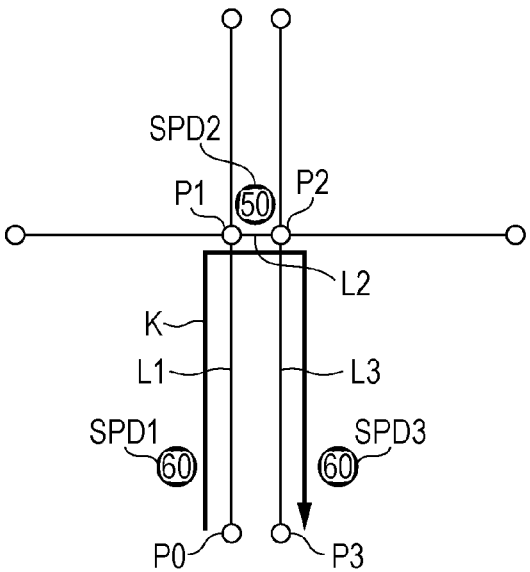
Figure 9B:
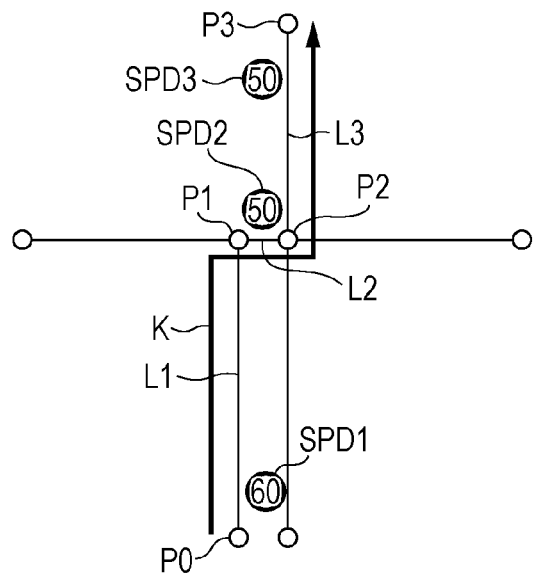

If the determination result in step S013 above indicates that the speed limit of the third segment differs from the speed limit of the first segment (the result in step S013 is Yes), the flow proceeds to step S014. An example of the case in which that the speed limit of the third segment differs from the speed limit of the first segment is that the speed limit of the road link L3 is 50 km/h and the speed limit of the road link L1 is 60 km/h, as illustrated in FIG. 8A. FIGS. 9A and 9B illustrate travelling examples of the vehicle in this case. The reference characters in FIGS. 9A and 9B are the same as in FIGS. 5A to 5C, so their explanation will be omitted.

Figure 9D:
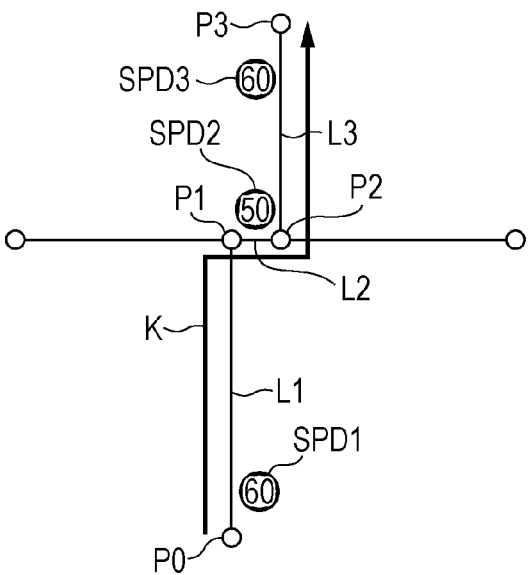

If the determination result in step S013 above indicates that the speed limit of the third segment matches the speed limit of the first segment (the result in step S013 is No), the flow proceeds to step S015. An example of the case in which the speed limit of the third segment matches the speed limit of the first segment is that the speed limit of the road link L3 is 60 km/h and the speed limit of the road link L1 is 60 km/h as illustrated in FIG. 8B. FIGS. 9C and 9D illustrate travelling examples of the vehicle in this case. The reference characters in FIGS. 9C and 9D are the same as in FIGS. 5A to 5C, so their explanation will be omitted.

If the determiner 202 determines that the speed limit of the third segment differs from the speed limit of the first segment (the result in step S013 is Yes), the controller 201 makes a switchover, in the pre-defined first switching method, from control under which the displayer 30 is caused to create the second predetermined image to control under which the displayer 30 is caused to create the third predetermined image (step S014). The third predetermined image is an image that represents a visual image indicating the speed limit of the third segment when the third predetermined image is displayed on the display medium. The visual image referred to here is, for example, a third visual image 103*a* illustrated in FIG. 11A, which will be referenced later. An example in which control is switched in the first switching method will be described later with reference to FIG. 11A.

In steps S014 and S015, the controller 201 outputs to the displayer 30 a command to make a control switchover and control information indicating the content of switched-to control.

Next, the displayer 30 creates the third predetermined image according to the control information received from the controller 201 and projects the third predetermined image to the display medium (step S016).

In the above description, if the third-segment length is shorter than the segment length setting, control has been switched in the second switching method. However, this is not a limitation. As illustrated in, for example, FIG. 10, the determiner 202 may further determine whether the speed limit of the third segment differs from the speed limit of the second segment (step S014). In FIG. 10, if the third-segment length is shorter than the segment length setting (the result in step S012 is Yes) and the speed limit of the third segment differs from the speed limit of the second segment (the result in step S014 is Yes), control is switched in the second switching method (step S016). If, however, the speed limit of the third segment matches the speed limit of the second segment (the result in step S014 is No), control may be switched in the third switching method described in the above first exemplary operation (step S017).

In the third switching method, the controller 201 only switches data processing from the displaying of the speed limit information corresponding to the road link L2 to the displaying of the speed limit information corresponding to the road link L3, so it is recognized by the driver, who is the user, that the display has not been essentially switched. In other words, when control is switched in the third switching method, the visual image displayed on the display medium remains unchanged before and after control is switched. As described above, when the third visual image 103*a* is displayed after the elapse of essentially zero time from when the second visual image 102 has disappeared, the driver has almost no visual botheration.

Next, specific examples of switching method (an image displayed on the display medium) in the first switching method and second switching method, which have been respectively described in steps S014 and S015 in FIG. 7, will be described below with reference to FIGS. 11A and 11B.

Figure 11A:
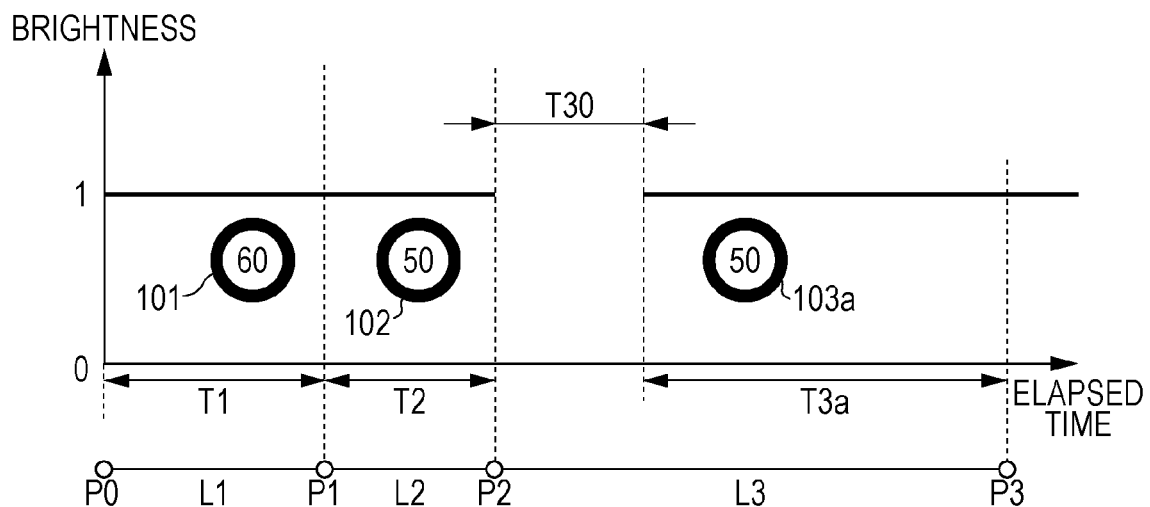
FIGS. 11A and 11B each illustrate a specific example of image display switching according to the first embodiment of the present disclosure.
Figure 11B:
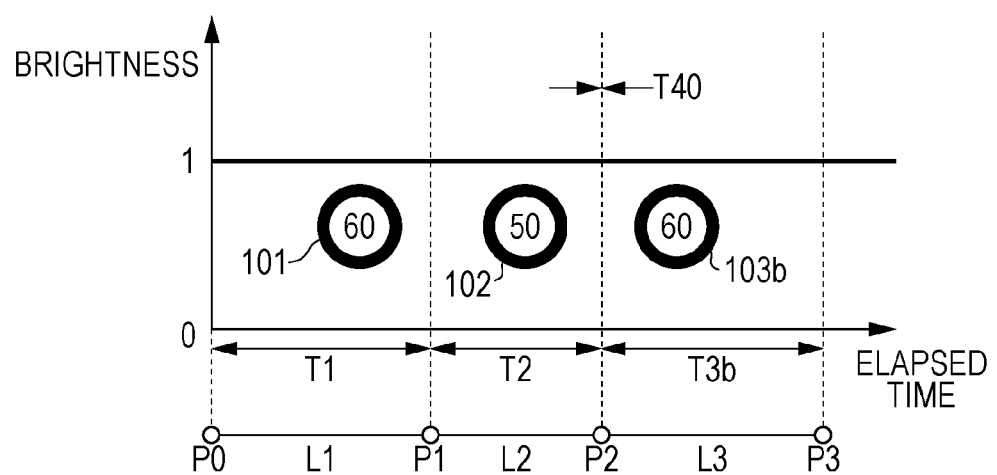

In FIGS. 11A and 11B, the brightness of a predetermined image, which has been described above, displayed on the display medium is indicated on the vertical axis, the brightness being a value relative to an arbitrary value, and a time during which the predetermined image is displayed on the display medium is indicated on the horizontal axis. The nodes P0 to P3 and road links L1 to L3 in FIGS. 11A and 11B are the same as in FIGS. 8A and 8B and FIGS. 9A to 9D. Time T1 is a time during which the first visual image 101 indicating the speed limit of the first segment (for example, 60 km/h) is displayed on the display medium. Time T2 is a time during which the second visual image 102 indicating the speed limit of the second segment (for example, 50 km/h) is displayed on the display medium. Time T3a is a time during which the third visual image 103a indicating the speed limit of the third segment (for example, 50 km/h) is displayed on the display medium. Time T3b is a time during which the third visual image 103b indicating the speed limit of the third segment (for example, 60 km/h) is displayed on the display medium.

The first visual image 101, second visual image 102, and third visual images 103a and 103b in FIGS. 11A and 11B are each, for example, a road sign image on which a speed limit is indicated at the center. When the display medium is an HUD, these visual images are recognized as virtual images by the occupant.

In FIGS. 11A and 11B, control before the vehicle enters the node P2 is the same as in FIG. 5C, so its explanation will be omitted here. In FIGS. 11A and 11B, screen display switching before the vehicle enters the node P2 is not limited to FIG. 5C; the screen display switching may be the same as in, for example, FIG. 5B.

Specific examples will be described with reference to FIGS. 11A and 11B. FIG. 11A illustrates a specific example in which is control is switched in the first switching method. FIG. 11B illustrates a specific example in which is control is switched in the second switching method.

First, a specific example in which is control is switched in the first switching method will be described with reference to FIG. 11A. The example in FIG. 11A illustrates control switching that occurs when the determiner 202 determines that the third-segment length is not shorter than the segment length setting and that the speed limit of the third segment differs from the speed limit of the first segment.

During time T2, the controller 201 controls the displayer 30 so that it creates the second predetermined image, which represents the second visual image 102 when the second predetermined image is displayed on the display medium, and displays the second predetermined image on the display medium at a predetermined brightness. Thus, the second visual image 102 is displayed on the display medium.

Then, when the vehicle enters the road link L3, the determiner 202 determines that the third-segment length LEN3 is not shorter than the segment length setting LEN0 and that the speed limit (50 km/h) of the third segment differs from the speed limit (60 km/h) of the first segment. In this case, the controller 201 controls the displayer 30 so that it stops the displaying of the second visual image 102 on the display medium at the time of arrival at the node P2 by stopping the creation of the second predetermined image representing the second visual image 102. Thus, when the vehicle arrives at the node P2, the second visual image 102 is not displayed on the display medium.

The controller 201 then controls the displayer 30 so that after the elapse of the pre-defined time T30 (for example, 0.5 or 1 second), the displayer 30 creates the third predetermined image, which represents the third visual image 103a when the third predetermined image is displayed on the display medium, and displays the third predetermined image on the display medium at a predetermined brightness (for example, the same brightness as the brightness of the second visual image 102). Thus, the third visual image 103a is displayed on the display medium. The controller 201 may control the displayer 30 so that it reads out the third predetermined image representing the third visual image 103a created in advance from a predetermined storage device and displays the third predetermined image at the predetermined brightness.

As described above, if the third-segment length is not shorter than the segment length setting and the speed limit of the third segment differs from the speed limit of the first segment, the third visual image 103a is displayed after the elapse of the pre-defined time T30 from when the display of the second visual image 102 has disappeared. Therefore, image switching becomes more outstanding, so the driver can easily recognize an image switchover. Even if, for example, the driver is not gazing at the display medium, the driver can notice an image switchover.

Next, a specific example in which is control is switched in the second switching method will be described with reference to FIG. 11B. The example in FIG. 11B illustrates control switching that occurs when the determiner 202 determines that the third-segment length is shorter than the segment length setting (the result in S012 in FIG. 7 is Yes). Alternatively, the example in FIG. 11B illustrates control switching that occurs when the determiner 202 determines that the third-segment length is not shorter than the segment length setting (the result in S012 in FIG. 7 is No) and that the speed limit of the third segment matches the speed limit of the first segment (the result in S013 in FIG. 7 is No).

The example in FIG. 11B differs from the example in FIG. 11A in that time T40 is applied instead of time T30. The other points are the same as in FIG. 11A, so their description will be omitted here. Although, in FIG. 11B, time T40, which has been pre-defined, is 0 as an example, time T40 may be zero or more but less than time T30 as in FIG. 5B. For example, time T40 may be set to, for example, a value of 20 ms or less according to the CFF, as described above.

As described above, if the third-segment length is shorter than the segment length setting or if the third-segment length is not shorter than the segment length setting and the speed limit of the third segment matches the speed limit of the first segment, the third visual image 103b is displayed on the display medium after the elapse of the pre-defined time T40 from when the display of the second visual image 102 has disappeared. Accordingly, image switching does not become outstanding when compared with a case in which the third-segment length is not shorter than the segment length setting and the speed limit of the third segment differs from the speed limit of the first segment, so the driver is less likely to feel bothered with a switchover between images.

As described above, after display control has been switched in the second switching method in the first exemplary operation, that is, when the vehicle enters a road segment with a short segment length and then a road segment with a non-short segment length, a comparison is made between the newly obtained speed limit of the road segment and the speed limit of a road segment with a non-short segment length before the immediately preceding road segment with a short segment length, instead of between the newly obtained speed limit of the road segment and the speed limit of the immediately preceding road segment with a short segment length.

If the comparison result indicates that the two speed limits match, display control is switched in the second switching method, in which a change is inconspicuous. In speed limit display for each segment, therefore, the speed limit of the relevant segment is displayed, and the botheration that display switching in a short segment is frequently carried out conspicuously can be eliminated.

If the comparison result indicates that the two speed limits do not match, in speed limit display for each segment, the speed limit of the relevant segment is displayed and display control is switched in the first switching method, in which a change is conspicuous, at a point in time at which the road on which the vehicle is travelling is switched to a segment with a non-short segment length. Therefore, it is possible for the driver to easily recognize a change in speed limit.

It is desirable that there be an essential match between a point in time at which the vehicle enters the road link L3 from the road link L2 and a point in time at which the road link on which the vehicle is travelling is switched to the road link L3. This is because the driver can be notified in real time that the speed limit information has changed. In the present disclosure, however, a match is not necessarily required between the vehicle enters the road link L3 from the road link L2 and a point in time at which the road link on which the vehicle is travelling is switched to the road link L3. A delay or an advance of a certain time is allowed and it does not restrict the range of the present disclosure. This is also true for other specific examples (illustrated in, for example, FIGS. 13A to 17B) described later.

This completes the explanation of the second exemplary operation of the display system 1 according to this embodiment.

In the first and second exemplary operations described above, the first exemplary operation (FIG. 2) and second exemplary operation (FIG. 7) may be replaced with the flowchart illustrated in FIG. 12. For example, as illustrated in the flow in FIG. 12, the determiner 202 may hold a comparative speed (see FIGS. 3A and 3B and FIGS. 8A and 8B, for example) as a value used for a determination, and after switching to control in the first control method, the controller 201 may update the comparative speed stored in the determiner 202 to a switched-to speed limit. The flow in FIG. 12 will be described below.

In FIG. 12, the second segment in FIG. 2 is replaced with an n-th segment and processing in steps S004 to S009 in FIG. 2 is replaced with processing in steps S101 to S106. In addition, processing to update a comparative speed with the speed limit of the n-th segment is added as step S107 after step S104, in which control is switched in the first switching method.

The flow in FIG. 12 is executed each time the road segment on which the vehicle is travelling is switched. First, if the road segment on which the vehicle is travelling is switched, information about the switched-to road segment is obtained as information about the n-th segment (step S101), after which it is determined whether the n-th-segment length is shorter than the segment length setting (step S102).

If the n-th-segment length is shorter than the segment length setting (the result in step S102 is Yes), control is switched in the second switching method (step S105). If the n-th-segment length is not shorter than the segment length setting (the result in step S102 is No), it is determined whether the speed limit of the n-th segment differs from the comparative speed (step S103).

If the speed limit of the n-th segment matches the comparative speed (the result in step S103 is No), control is switched in the second control method (step S105). If the speed limit of the n-th segment differs from the comparative speed (the result in step S103 is Yes), control is switched in the first control method (step S104).

After display control has been switched in the first switching method (step S104), the comparative speed stored in the determiner 202 is updated (step S107). That is, the comparative speed is updated by storing the switched-to speed limit in the determiner 202 as a new comparative speed. After display control has been switched in the second switching method (step S105), the comparative speed is not updated. That is, if switching to a road segment with a short segment length is carried out, display switching in the first switching method is not carried out, the comparative speed is not updated.

An n-th predetermined image is created (step S106).

According to the flow in FIG. 12, if the newly obtained speed limit differs from the speed limit of the immediately preceding road segment with a non-short segment length, display control is switched switching in the first switching method, in which a change is outstanding, and before and after a road segment with a short segment length, display control is switched in the second switching method, in which a change is not outstanding. This completes the description of the flow in FIG. 12.

In the above first and second exemplary operations, specific examples of the switching of control (image displayed on the display medium) in the first switching method in step S007 in FIG. 2 and step S014 in FIG. 7 and in the second switching method in step S008 in FIG. 2 and step S015 in FIG. 7 have been described with reference to FIGS. 5A to 5C and FIGS. 11A and 11B. First to fifth specific examples other than the above specific examples will be described below. In the first to fifth specific examples below, a case in which the vehicle enters the road link L2 from the road link L1 will be taken as an example. However, the first to fifth specific examples are also applicable to a case in which the vehicle enters the road link L3 from the road link L2 in the same way.

First Specific Example

Figure 13A:
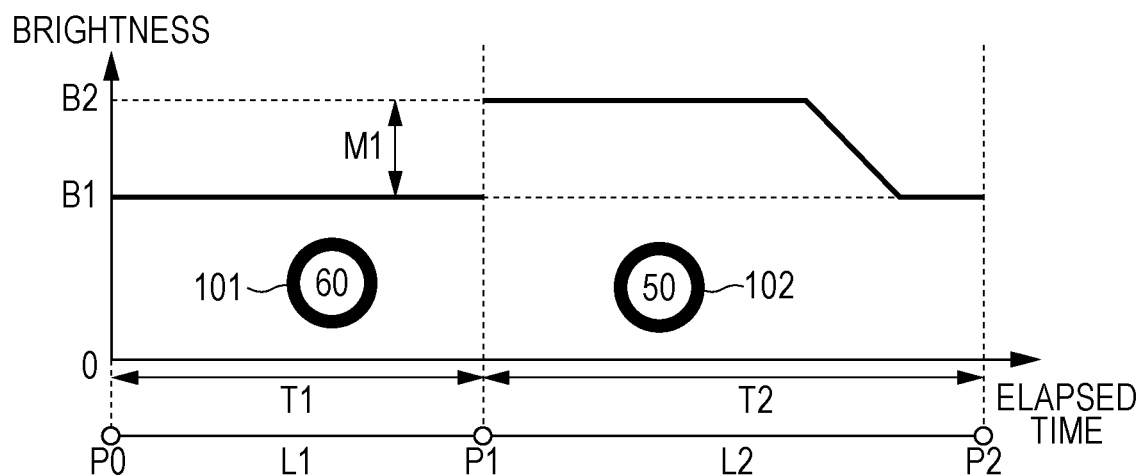
FIGS. 13A and 13B each illustrate a first another specific example of image display switching according to the first embodiment of the present disclosure.
Figure 13B:
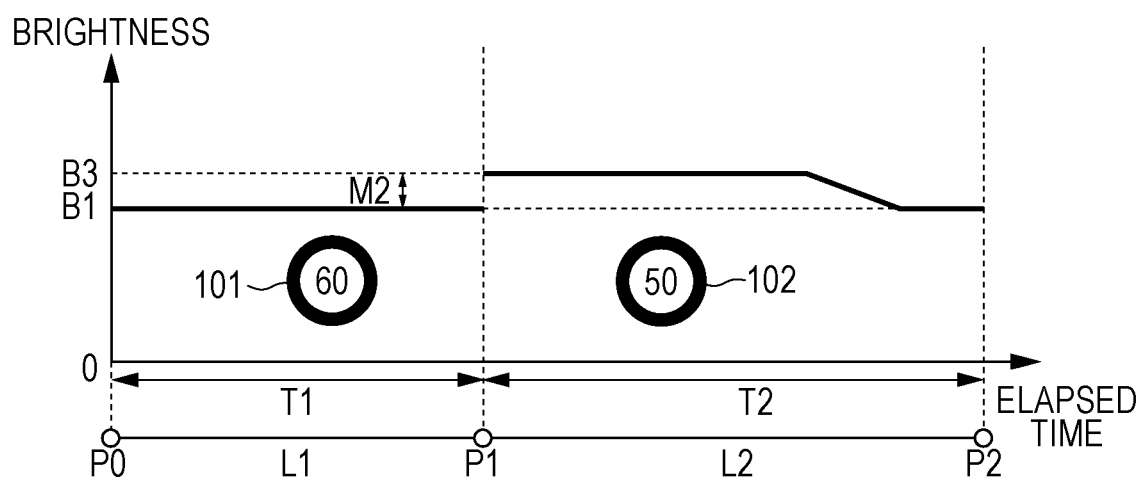

The first specific example will be described with reference to FIGS. 13A and 13B. FIG. 13A illustrates a specific example in which control is switched in the first switching method. FIG. 13B illustrates a specific example in which control is switched in the second switching method.

First, a specific example in which control is switched in the first switching method will be described with reference to FIG. 13A.

During time T1, the controller 201 controls the displayer 30 so that it creates the first predetermined image, which represents the first visual image 101 when the first predetermined image is displayed on the display medium, and displays the first predetermined image on the display medium at a first brightness B1. Thus, the first visual image 101 is displayed on the display medium.

Then, when the vehicle enters the road link L2, if the determiner 202 determines that the second-segment length is not shorter than the segment length setting and that the speed limit of the second segment differs from the speed limit of the first segment, the controller 201 controls the displayer 30 so that when the road link on which the vehicle is travelling is switched, the displayer 30 stops the displaying of the first visual image 101 on the display medium by stopping the creation of the first predetermined image representing the first visual image 101. Thus, when the road link on which the vehicle is travelling is switched, the first visual image 101 is not displayed on the display medium.

The time when the road link on which the vehicle is travelling is switched may be, for example, a time when the vehicle arrives at the node P1 or a time when the vehicle essentially arrives at the node P1, that is, a time after the elapse of a predetermined time from when the vehicle arrives at the node P1. The definition of the time when the road link on which the vehicle is travelling is switched is a design item and does not restrict the range of the present disclosure. This is also true for the description below.

The controller 201 also controls the displayer 30 so that it creates the second predetermined image, which represents the second visual image 102 when the second predetermined image is displayed on the display medium, and displays the second predetermined image on the display medium at a second brightness B2, the absolute value of a difference between the first brightness B1 and the second brightness B2 being M1. Thus, the second visual image 102 is displayed on the display medium. The absolute value M1 is larger than an absolute value M2 indicated in FIG. 13B, which will be referenced later. In FIG. 13A, the second brightness B2 has a larger value than the first brightness B1, as an example.

After the second visual image 102 has been displayed, the controller 201 controls the displayer 30 at a predetermined timing so that the displayer 30 starts to gradually reduce the second brightness B2 to the first brightness B1.

Next, a specific example in which control is switched in the second switching method will be described with reference to FIG. 13B.

During time T1, the controller 201 controls the displayer 30 so that it creates the first predetermined image, which represents the first visual image 101 when the first predetermined image is displayed on the display medium, and displays the first predetermined image on the display medium at the first brightness B1. Thus, the first visual image 101 is displayed on the display medium.

Then, when the vehicle enters the road link L2, if the determiner 202 determines that the second-segment length is shorter than the segment length setting, the controller 201 controls the displayer 30 so that when the road link on which the vehicle is travelling is switched, the displayer 30 stops the displaying of the first visual image 101 on the display medium by stopping the creation of the first predetermined image representing the first visual image 101. Thus, when the road link on which the vehicle is travelling is switched, the first visual image 101 is not displayed on the display medium.

The controller 201 also controls the displayer 30 so that it creates the second predetermined image, which represents the second visual image 102 when the second predetermined image is displayed on the display medium, and displays the second predetermined image on the display medium at a third brightness B3, the absolute value of a difference between the first brightness B1 and the third brightness B3 being M2. Thus, the second visual image 102 is displayed on the display medium. The absolute value M2 is smaller than the absolute value M1 indicated in FIG. 13A. In FIG. 13B, the third brightness B3 has a larger value than the first brightness B1 but has a smaller value than the second brightness B2, as an example.

After the second visual image 102 has been displayed, the controller 201 controls the displayer 30 at a predetermined timing so that the displayer 30 starts to gradually reduce the third brightness B3 to the first brightness B1.

As described above, if the second-segment length is not shorter than the segment length setting and the speed limit of the second segment differs from the speed limit of the first segment, the range of a change in brightness on the display medium at the time of switching from the first visual image 101 to the second visual image 102 is larger than when the second-segment length is shorter than the segment length setting. Therefore, image switching becomes more outstanding, so the driver can easily recognize an image switchover. Even if, for example, the driver is not gazing at the display medium, the driver can notice an image switchover. If the second-segment length is shorter than the segment length setting, the range of a change in brightness on the display medium at the time of switching from the first visual image 101 to the second visual image 102 is smaller than when the second-segment length is not shorter than the segment length setting and the speed limit of the second segment differs from the speed limit of the first segment. Accordingly, image switching does not relatively become outstanding, so the driver is less likely to feel bothered with a switchover between images.

Although, a case in which both the second brightness B2 and the third brightness B3 are higher than the first brightness B1 has been described above as an example, this is not a limitation. That is, in this specific example, if the condition is satisfied that the absolute value M2 is smaller than the absolute value M1, both the second brightness B2 and the third brightness B3 may be lower than the first brightness B1. Alternatively, the third brightness B3 may be equal to the first brightness B1, or one of the second brightness B2 and third brightness B3 may be higher than the first brightness B1 and the other may be lower than the first brightness B1.

Second Specific Example

Figure 14A:
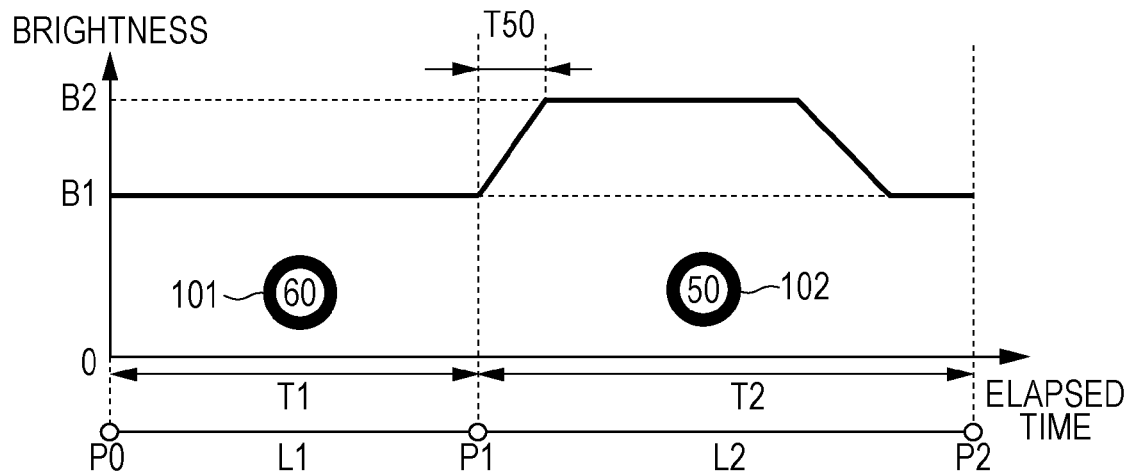
FIGS. 14A and 14B each illustrate a second another specific example of image display switching according to the first embodiment of the present disclosure.
Figure 14B:
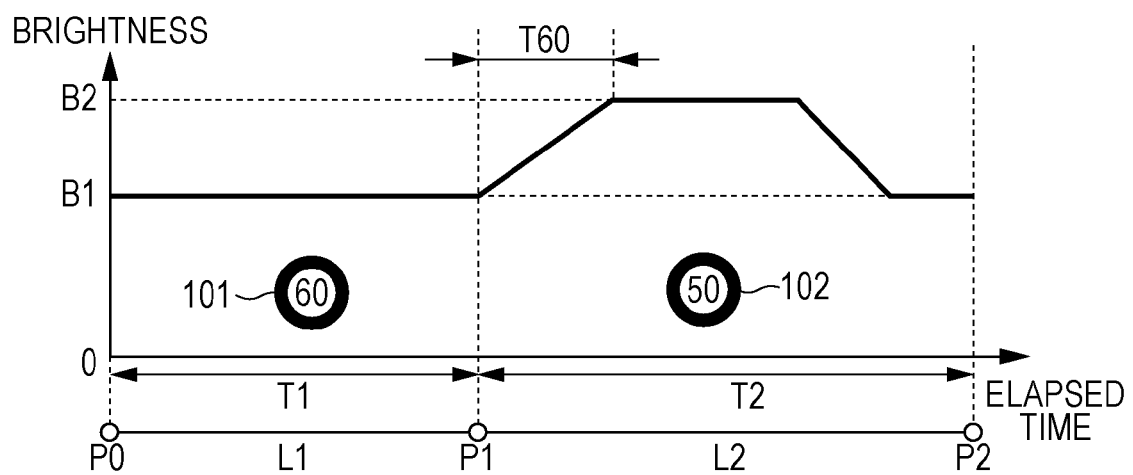

The second specific example will be described with reference to FIGS. 14A and 14B. FIG. 14A illustrates a specific example in which control is switched in the first switching method. FIG. 14B illustrates a specific example in which control is switched in the second switching method.

First, a specific example in which control is switched in the first switching method will be described with reference to FIG. 14A.

During time T1, the controller 201 controls the displayer 30 so that it creates the first predetermined image, which represents the first visual image 101 when the first predetermined image is displayed on the display medium, and displays the first predetermined image on the display medium at the first brightness B1. Thus, the first visual image 101 is displayed on the display medium.

Then, when the vehicle enters the road link L2, if the determiner 202 determines that the second-segment length is not shorter than the segment length setting and that the speed limit of the second segment differs from the speed limit of the first segment, the controller 201 controls the displayer 30 so that when the road link on which the vehicle is travelling is switched, the displayer 30 stops the displaying of the first visual image 101 on the display medium by stopping the creation of the first predetermined image representing the first visual image 101. Thus, when the road link on which the vehicle is travelling is switched, the first visual image 101 is not displayed on the display medium.

The controller 201 also controls the displayer 30 so that it creates the second predetermined image, which represents the second visual image 102 when the second predetermined image is displayed on the display medium, and displays the second predetermined image on the display medium while gradually increasing its brightness from the first brightness B1 to the second brightness B2 in a pre-defined time T50. Thus, the second visual image 102 is displayed on the display medium. Time T50 has a smaller value than time T60 indicated in FIG. 14B, which will be referenced later. In FIG.

14A, the second brightness B2 has a larger value than the first brightness B1, as an example. However, the second brightness B2 may have a smaller value than the first brightness B1.

After the second visual image 102 has been displayed, the controller 201 controls the displayer 30 at a predetermined timing so that the displayer 30 starts to gradually reduce the second brightness B2 to the first brightness B1.

Next, a specific example in which control is switched in the second switching method will be described with reference to FIG. 14B.

During time T1, the controller 201 controls the displayer 30 so that it creates the first predetermined image, which represents the first visual image 101 when the first predetermined image is displayed on the display medium, and displays the first predetermined image on the display medium at the first brightness B1. Thus, the first visual image 101 is displayed on the display medium.

Then, when the vehicle enters the road link L2, if the determiner 202 determines that the second-segment length is shorter than the segment length setting, the controller 201 controls the displayer 30 so that it stops the displaying of the first visual image 101 on the display medium by stopping the creation of the first predetermined image representing the first visual image 101 when the road link on which the vehicle is travelling is switched. Thus, when the road link on which the vehicle is travelling is switched, the first visual image 101 is not displayed on the display medium.

The controller 201 also controls the displayer 30 so that it creates the second predetermined image, which represents the second visual image 102 when the second predetermined image is displayed on the display medium, and displays the second predetermined image on the display medium while gradually increasing its brightness from the first brightness B1 to the second brightness B2 in time T60, which has been pre-defined. Thus, the second visual image 102 is displayed on the display medium. Time T60 has a larger value than time T50, in FIG. 14A, described above. In FIG. 14B, the second brightness B2 has a larger value than the first brightness B1, as an example. However, the second brightness B2 may have a smaller value than the first brightness B1.

After the second visual image 102 has been displayed, the controller 201 controls the displayer 30 at a predetermined timing so that the displayer 30 starts to gradually reduce the second brightness B2 to the first brightness B1.

As described above, if the second-segment length is not shorter than the segment length setting and the speed limit of the second segment differs from the speed limit of the first segment, brightness on the display medium abruptly changes at the time of switching from the first visual image 101 to the second visual image 102 when compared with a case in which the second-segment length is shorter than the segment length setting. Therefore, image switching becomes more outstanding, so the driver can easily recognize an image switchover. Even if, for example, the driver is not gazing at the display medium, the driver can notice an image switchover. If the second-segment length is shorter than the segment length setting, brightness on the display medium slowly changes at the time of switching from the first visual image 101 to the second visual image 102 when compared with a case in which the second-segment length is not shorter than the segment length setting and the speed limit of the second segment differs from the speed limit of the first segment. Accordingly, image switching does not relatively become outstanding, so the driver is less likely to feel bothered with a switchover between images.

Although, a case in which the second brightness B2 is higher than the first brightness B1 has been described above, this is not a limitation. That is, in this specific example, if the condition is satisfied that time T60 has a larger value than time T50, the second brightness B2 may be lower than the first brightness B1.

Third Specific Example

Figure 15A:
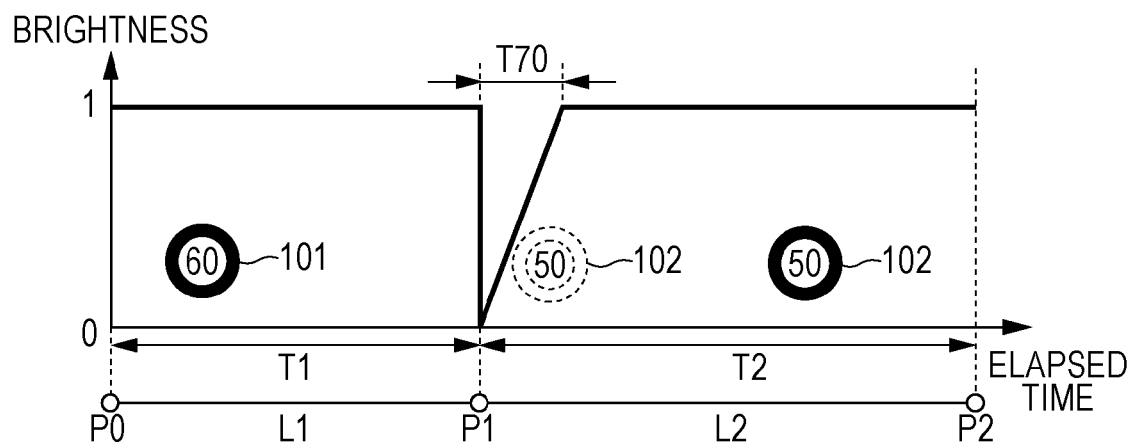
FIGS. 15A and 15B each illustrate a third another specific example of image display switching according to the first embodiment of the present disclosure.
Figure 15B:
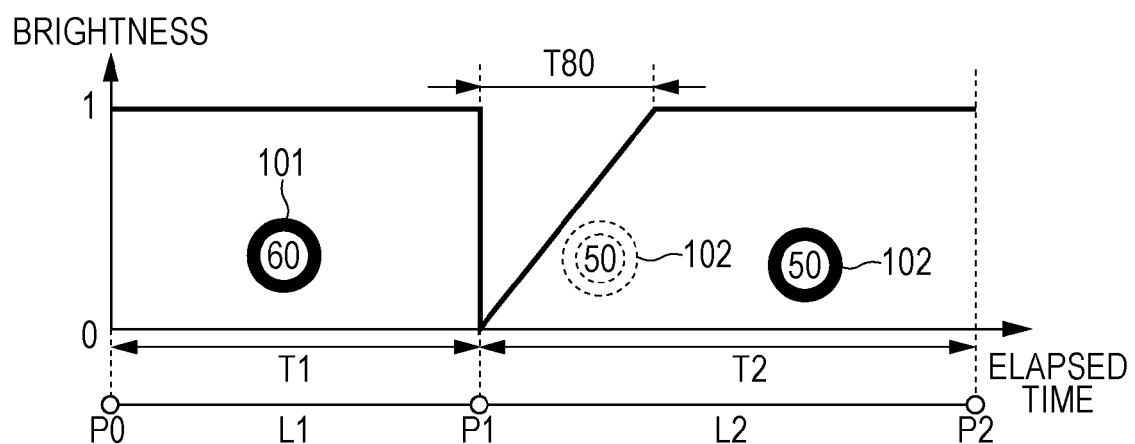

The third specific example will be described with reference to FIGS. 15A and 15B. FIG. 15A illustrates a specific example in which control is switched in the first switching method. FIG. 15B illustrates a specific example in which control is switched in the second switching method.

First, a specific example in which control is switched in the first switching method will be described with reference to FIG. 15A.

During time T1, the controller 201 controls the displayer 30 so that it creates the first predetermined image, which represents the first visual image 101 when the first predetermined image is displayed on the display medium, and displays the first predetermined image on the display medium at a predetermined brightness. Thus, the first visual image 101 is displayed on the display medium.

Then, when the vehicle enters the road link L2, if the determiner 202 determines that the second-segment length is not shorter than the segment length setting and that the speed limit of the second segment differs from the speed limit of the first segment, the controller 201 controls the displayer 30 so that when the road link on which the vehicle is travelling is switched, the displayer 30 stops the displaying of the first visual image 101 on the display medium by stopping the creation of the first predetermined image representing the first visual image 101. Thus, when the road link on which the vehicle is travelling is switched, the first visual image 101 is not displayed on the display medium.

The controller 201 also controls the displayer 30 so that it creates the second predetermined image, which represents the second visual image 102 when the second predetermined image is displayed on the display medium, and displays the second predetermined image on the display medium while gradually increasing its brightness in a pre-defined time T70. Thus, the second visual image 102 is displayed on the display medium. The value of time T70 is smaller than the value of time T80 indicated in FIG. 15B, which will be referenced later, but larger than, for example, 20 ms set according to the CFF described above. That is, the relationship of 20 ms<T70<T80 holds. Although, in FIG. 15A, the brightness of the second visual image 102 is increased to the brightness of the first visual image 101, the brightness of the second visual image 102 may be increased to a predetermined brightness higher than the brightness of the first visual image 101.

Next, a specific example in which control is switched in the second switching method will be described with reference to FIG. 15B.

During time T1, the controller 201 controls the displayer 30 so that it creates the first predetermined image, which represents the first visual image 101 when the first predetermined image is displayed on the display medium, and displays the first predetermined image on the display medium at a predetermined brightness. Thus, the first visual image 101 is displayed on the display medium.

Then, when the vehicle enters the road link L2, if the determiner 202 determines that the second-segment length is shorter than the segment length setting, the controller 201 controls the displayer 30 so that it stops the displaying of the first visual image 101 on the display medium by stopping the creation of the first predetermined image representing the first visual image 101 when the road link on which the vehicle is travelling is switched. Thus, when the road link on which the vehicle is travelling is switched, the first visual image 101 is not displayed on the display medium.

The controller 201 also controls the displayer 30 so that it creates the second predetermined image, which represents the second visual image 102 when the second predetermined image is displayed on the display medium, and displays the second predetermined image on the display medium while gradually increasing its brightness in time T80, which has been pre-defined. Thus, the second visual image 102 is displayed on the display medium. Time T80 has a larger value than time T70, in FIG. 15A, described above. Although, in FIG. 15B, the brightness of the second visual image 102 is increased to the brightness of the first visual image 101, the brightness of the second visual image 102 may be increased to a predetermined brightness higher than the brightness of the first visual image 101.

As described above, if the second-segment length is not shorter than the segment length setting and the speed limit of the second segment differs from the speed limit of the first segment, brightness on the display medium abruptly changes at the time of switching from the first visual image 101 to the second visual image 102 when compared with a case in which the second-segment length is shorter than the segment length setting. Therefore, image switching becomes more outstanding, so the driver can easily recognize an image switchover. Even if, for example, the driver is not gazing at the display medium, the driver can notice an image switchover. If the second-segment length is shorter than the segment length setting, brightness on the display medium slowly changes at the time of switching from the first visual image 101 to the second visual image 102 when compared with a case in which the second-segment length is not shorter than the segment length setting and the speed limit of the second segment differs from the speed limit of the first segment. Accordingly, image switching does not relatively become outstanding, so the driver is less likely to feel bothered with a switchover between images.

Fourth Specific Example

Figure 16A:
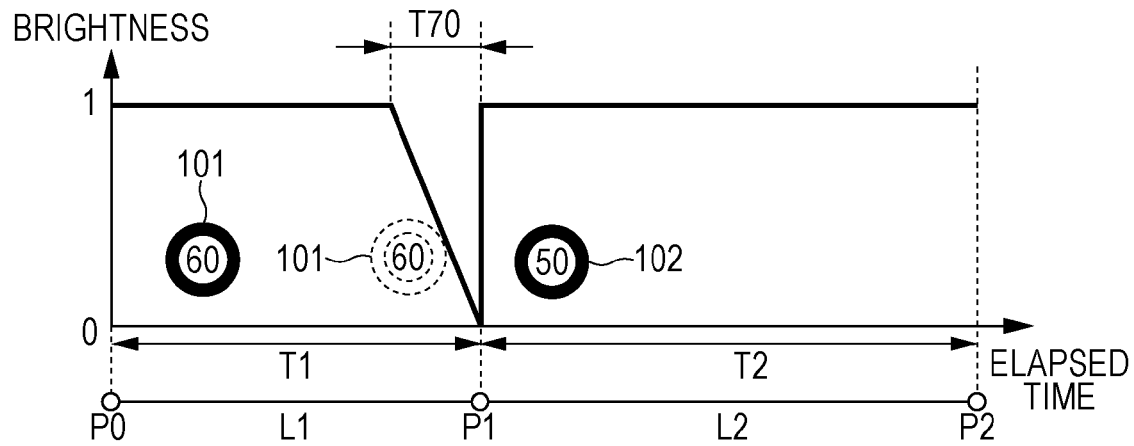
FIGS. 16A and 16B each illustrate a fourth another specific example of image display switching according to the first embodiment of the present disclosure.
Figure 16B:
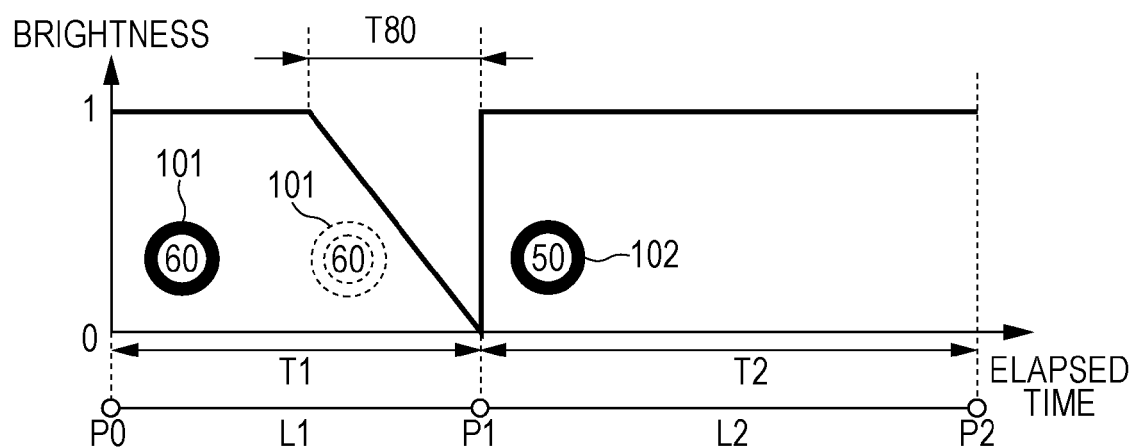

The fourth specific example will be described with reference to FIGS. 16A and 16B. FIG. 16A illustrates a specific example in which control is switched in the first switching method. FIG. 16B illustrates a specific example in which control is switched in the second switching method.

In this specific example, a case will be specifically described in which the second speed limit information associated with the road link L2 by the obtainer 10 is obtained at a predetermined timing during time T1 and the determiner 202 determines that the second-segment length is not shorter than the segment length setting and that the speed limit of the second segment differs from the speed limit of the first segment. The predetermined timing is, for example, a time several seconds or ten-odd seconds before the vehicle enters the road link L2. To obtain the second-segment length information, a map information database that stores information about road link connections, for example, is referenced while the vehicle is travelling on the road link L1. Thus, segment length information about the road link L2 connected to the road link L1 is obtained in advance. If a plurality of road links are connected to the first link, information about a road on which the vehicle is to travel may be obtained from navigation information and information about the road link L2 may then be obtained.

First, a specific example in which control is switched in the first switching method will be described with reference to FIG. 16A.

During a time duration earlier than time T70 in time T1, the controller 201 controls the displayer 30 so that it creates the first predetermined image, which represents the first visual image 101 when the first predetermined image is displayed on the display medium, and displays the first predetermined image on the display medium at a predetermined brightness. Thus, the first visual image 101 is displayed on the display medium.

Then, at a predetermined timing before the road link on which the vehicle is travelling is switched, if the determiner 202 determines that the second-segment length is not shorter than the segment length setting and that the speed limit of the second segment differs from the speed limit of the first segment, the controller 201 controls the displayer 30 so that when the road link on which the vehicle is travelling is switched, the displayer 30 stops the displaying of the first visual image 101 on the display medium by stopping the creation of the first predetermined image representing the first visual image 101 while gradually decreasing its brightness during the pre-defined time T70. The value of time T70 is as described in the third specific example above. Thus, when the road link on which the vehicle is travelling is switched, the first visual image 101 is not displayed on the display medium.

When the vehicle enters the road link L2, the controller 201 also controls the displayer 30 so that it creates the second predetermined image, which represents the second visual image 102 when the second predetermined image is displayed on the display medium, and displays the second predetermined image on the display medium at a predetermined brightness. Thus, the second visual image 102 is displayed on the display medium. Although, in FIG. 16A, the brightness of the second visual image 102 is equal to the brightness of the first visual image 101, the brightness of the second visual image 102 may be a predetermined brightness higher than the brightness of the first visual image 101.

Next, a specific example in which control is switched in the second switching method will be described with reference to FIG. 16B.

During a time duration earlier than time T80 in time T1, the controller 201 controls the displayer 30 so that it creates the first predetermined image, which represents the first visual image 101 when the first predetermined image is displayed on the display medium, and displays the first predetermined image on the display medium at a predetermined brightness. Thus, the first visual image 101 is displayed on the display medium.

Then, at a predetermined timing before the road link on which the vehicle is travelling is switched, if the determiner 202 determines that the second-segment length is shorter than the segment length setting, the controller 201 controls the displayer 30 so that when the road link on which the vehicle is travelling is switched, the displayer 30 stops the displaying of the first visual image 101 on the display medium by stopping the creation of the first predetermined image representing the first visual image 101 while gradually decreasing its brightness during the pre-defined time T80. The value of time T80 is as described in the third specific example above. Thus, when the road link on which the vehicle is travelling is switched, the first visual image 101 is not displayed on the display medium.

When the vehicle enters the road link L2, the controller 201 also controls the displayer 30 so that it creates the second predetermined image, which represents the second visual image 102 when the second predetermined image is displayed on the display medium, and displays the second predetermined image on the display medium at a predetermined brightness. Thus, the second visual image 102 is displayed on the display medium. Although, in FIG. 16B, the brightness of the second visual image 102 is equal to the brightness of the first visual image 101, the brightness of the second visual image 102 may be a predetermined brightness higher than the brightness of the first visual image 101.

As described above, if the second-segment length is not shorter than the segment length setting and the speed limit of the second segment differs from the speed limit of the first segment, brightness on the display medium abruptly changes at the time of switching from the first visual image 101 to the second visual image 102 when compared with a case in which the second-segment length is shorter than the segment length setting. Therefore, image switching becomes more outstanding, so the driver can easily recognize an image switchover. Even if, for example, the driver is not gazing at the display medium, the driver can notice an image switchover. If the second-segment length is shorter than the segment length setting, brightness on the display medium slowly changes at the time of switching from the first visual image 101 to the second visual image 102 when compared with a case in which the second-segment length is not shorter than the segment length setting and the speed limit of the second segment differs from the speed limit of the first segment. Accordingly, image switching does not relatively become outstanding, so the driver is less likely to feel bothered with a switchover between images.

Fifth Specific Example

Figure 17A:
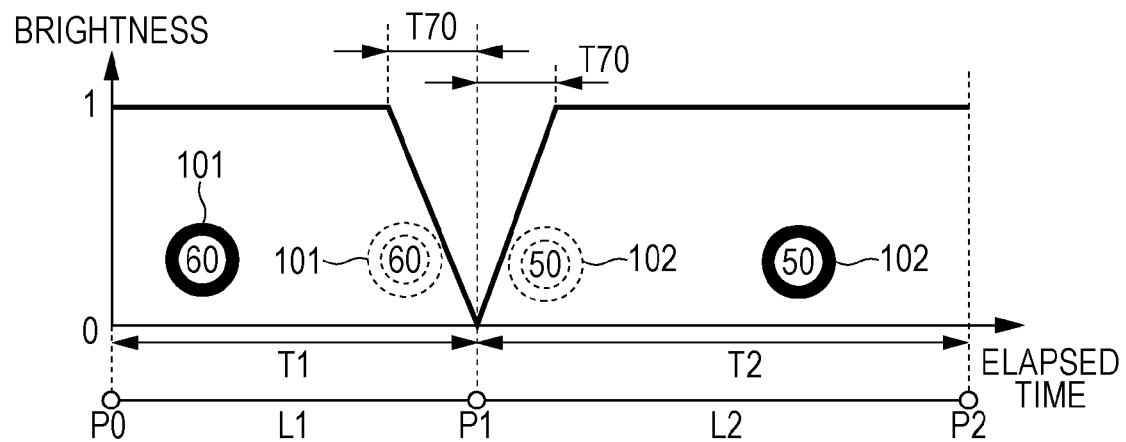
FIGS. 17A and 17B each illustrate a fifth another specific example of image display switching according to the first embodiment of the present disclosure.
Figure 17B:
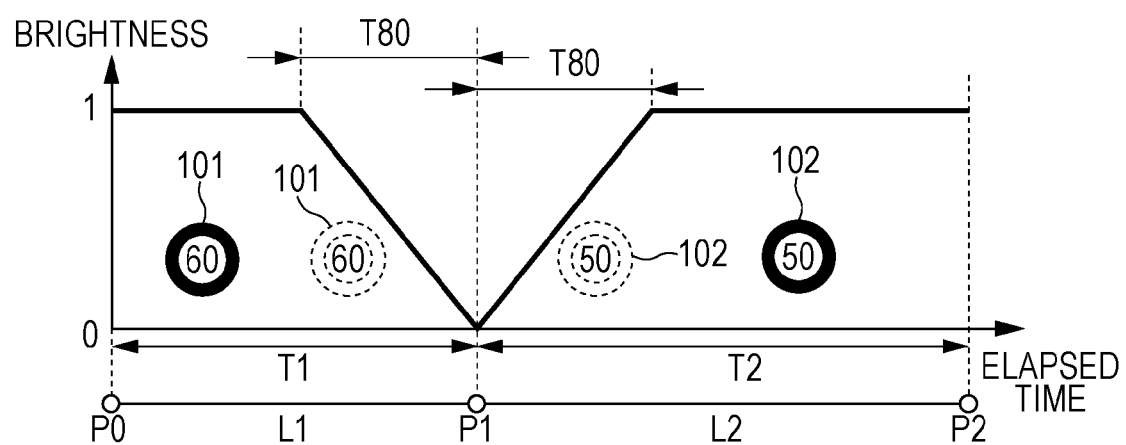

The fifth specific example will be described with reference to FIGS. 17A and 17B. This specific example is a combination of the third specific example and fourth specific example described above. FIG. 17A illustrates a specific example in which control is switched in the first switching method. FIG. 17B illustrates a specific example in which control is switched in the second switching method.

First, a specific example in which control is switched in the first switching method will be described with reference to FIG. 17A.

During a time duration earlier than time T70 in time T1, the controller 201 controls the displayer 30 so that it creates the first predetermined image, which represents the first visual image 101 when the first predetermined image is displayed on the display medium, and displays the first predetermined image on the display medium at a predetermined brightness. Thus, the first visual image 101 is displayed on the display medium.

Then, at a predetermined timing before the road link on which the vehicle is travelling is switched, if the determiner 202 determines that the second-segment length is not shorter than the segment length setting and that the speed limit of the second segment differs from the speed limit of the first segment, the controller 201 controls the displayer 30 so that when the road link on which the vehicle is travelling is switched, the displayer 30 stops the displaying of the first visual image 101 on the display medium by stopping the creation of the first predetermined image representing the first visual image 101 while gradually decreasing its brightness during time T70. Thus, when the road link on which the vehicle is travelling is switched, the first visual image 101 is not displayed on the display medium.

When the vehicle enters the road link L2, the controller 201 also controls the displayer 30 so that it creates the second predetermined image, which represents the second visual image 102 when the second predetermined image is displayed on the display medium, and displays the second predetermined image on the display medium while gradually increasing its brightness in time T70. Thus, the second visual image 102 is displayed on the display medium.

In this specific example, the value of time T70 is smaller than the value of time T80 indicated in FIG. 17B, which will be referenced later, but larger than, for example, 20 ms set according to the CFF described above. That is, the relationship of 20 ms<T70<T80 holds.

Next, a specific example in which control is switched in the second switching method will be described with reference to FIG. 17B.

During a time duration earlier than time T80 in time T1, the controller 201 controls the displayer 30 so that it creates the first predetermined image, which represents the first visual image 101 when the first predetermined image is displayed on the display medium, and displays the first predetermined image on the display medium at a predetermined brightness. Thus, the first visual image 101 is displayed on the display medium.

Then, at a predetermined timing before the road link on which the vehicle is travelling is switched, if the determiner 202 determines that the second-segment length is shorter than the segment length setting, the controller 201 controls the displayer 30 so that when the road link on which the vehicle is travelling is switched, the displayer 30 stops the displaying of the first visual image 101 on the display medium by stopping the creation of the first predetermined image representing the first visual image 101 while gradually decreasing its brightness during time T80. Thus, when the road link on which the vehicle is travelling is switched, the first visual image 101 is not displayed on the display medium.

When the vehicle enters the road link L2, the controller 201 also controls the displayer 30 so that it creates the second predetermined image, which represents the second visual image 102 when the second predetermined image is displayed on the display medium, and displays the second predetermined image on the display medium while gradually increasing its brightness in time T80. Thus, the second visual image 102 is displayed on the display medium.

As described above, if the second-segment length is not shorter than the segment length setting and the speed limit of the second segment differs from the speed limit of the first segment, brightness on the display medium abruptly changes at the time of switching from the first visual image 101 to the second visual image 102 when compared with a case in which the second-segment length is shorter than the segment length setting. Therefore, image switching becomes more outstanding, so the driver can easily recognize an image switchover. Even if, for example, the driver is not gazing at the display medium, the driver can notice an image switchover. If the second-segment length is shorter than the segment length setting, brightness on the display medium slowly changes at the time of switching from the first visual image 101 to the second visual image 102 when compared with a case in which the second-segment length is not shorter than the segment length setting and the speed limit of the second segment differs from the speed limit of the first segment. Accordingly, image switching does not relatively become outstanding, so the driver is less likely to feel bothered with a switchover between images.

As described above, in this embodiment, if the second-segment length that the vehicle has entered is not shorter than the segment length setting and the speed limit of the second segment differs from the speed limit of the first segment, image switching becomes more outstanding, so the driver can easily recognize an image switchover. In this embodiment, if the second-segment length that the vehicle has entered is shorter than the segment length setting, image switching does not become outstanding, so the driver is less likely to feel bothered with a switchover between images. In this embodiment, therefore, the visibility of speed limit information displayed on a display medium can be improved.

This completes the description of the embodiment of the present disclosure. However, the present disclosure is not limited to the above embodiment; various variations are possible. These variations will be described below.

First Variation

Although, in the above embodiment, the shape of an image representing a speed limit (for example, the first visual image 101 or second visual image 102) has been of a type of road sign, this is not a limitation on the shape of the image. Other examples of images will be described below with reference to FIG. 18A to 18D.

Figure 18C:
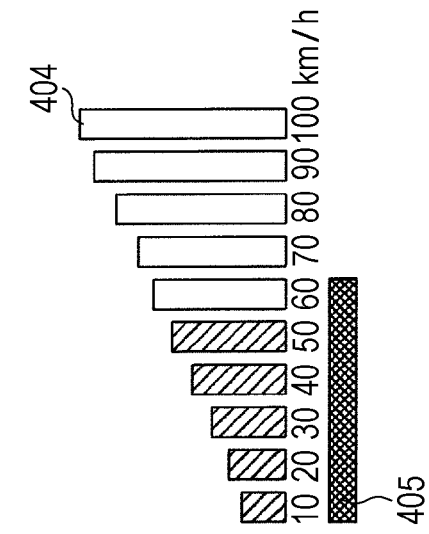
FIGS. 18A to 18D each illustrate an image display example in a variation of the first embodiment of the present disclosure.
Figure 18D:
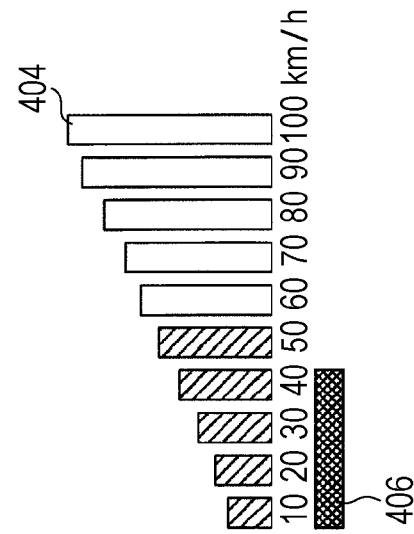
Figure 18A:
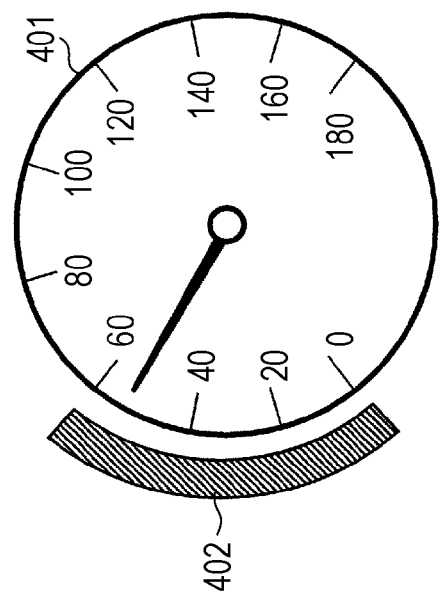
Figure 18B:
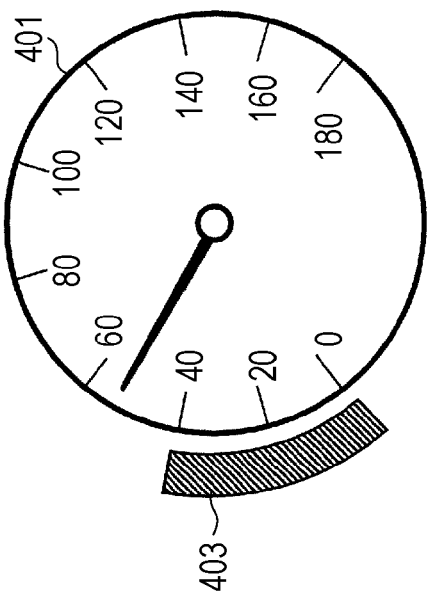

FIG. 18A illustrates an example in which an image 402 is displayed in the vicinity of a circular speedmeter 401. FIG. 18B illustrates another example in which an image 403 is displayed in the vicinity of the speedmeter 401. The images 402 and 403 have a shape along the speedmeter 401. The image 402 in FIG. 18A indicates that the speed limit of the road link on which the vehicle is travelling is, for example, 60 km/h. The image 403 in FIG. 18B indicates that the speed limit of the road link on which the vehicle is travelling is, for example, 40 km/h.

FIG. 18C illustrates an example in which an image 405 is displayed in the vicinity of a speedmeter 404 formed with a plurality of bars having different lengths. FIG. 18D illustrates another example in which an image 406 is displayed in the vicinity of the speedmeter 404. The images 405 and 406 are a bar perpendicular to the bars constituting the speedmeter 404. The image 405 in FIG. 18C indicates that the speed limit of the road link on which the vehicle is travelling is, for example, 60 km/h. The image 406 in FIG. 18D indicates that the speed limit of the road link on which the vehicle is travelling is, for example, 40 km/h. The images 402 and 405 correspond to the first visual image 101 described above, and the images 403 and 406 correspond to the second visual image 102 described above.

Second Variation

In step S005 in FIG. 2 in the above embodiment, for example, one segment length setting has been used to make a determination as to whether the second-segment length is shorter than the segment length setting and the determination result has been classified as one of two types. However, a plurality of segment length settings may be used to make a determination and the determination result may be classified as one of three types or more. If, for example, a determination result is classified as one of three types according to two segment length settings, image switching may be controlled according to three different time durations (for example, time T30 in FIG. 5A, time T40 in FIG. 5B, and time T40 in FIG. 5C), which have been pre-defined in correspondence to the three determination results. Since, in this variation, a duration in image switching can be adjusted according to the second-segment length, as described above, the degree by which image switching is outstanding can be adjusted. This variation can also be applied to other embodiments.

Third Variation

In the above embodiment, the speed limit information has been prestored in a predetermined storage device in correspondence to individual road links in map information and the obtainer 10 has obtained the speed limit information from the predetermined storage unit, but this is not a limitation. For example, the speed limit information may be obtained through road-to-vehicle communication or from image information such as a road sign. When the speed limit information is obtained from a road sign, the obtainer 10 obtains, for example, image information about a road sign (which indicates a speed limit) that is captured by a vehicle-mounted camera. Then, the obtainer 10 or an image processor (not illustrated) performs image analysis on the above image information and extracts speed limit information.

Fourth Variation

The first switching method is not limited to the methods described in the specific examples and the other specific examples (first to fifth specific examples) in the above embodiment. For example, the second visual image 102 may be displayed so as to be enlarged when compared with the first visual image 101. Alternatively, for example, the second visual image 102 may be displayed in different colors from the first visual image 101. Alternatively, for example, the second visual image 102 may have a different shape from the first visual image 101. Alternatively, for example, the second visual image 102 may be displayed so as to have a predetermined motion. Thus, the driver can easily recognize an image switchover.

Fifth Variation

In the above embodiment, the controller 201 has controlled the displayer 30 so that it creates the first visual image 101 or second visual image 102 and displays it on the display medium, but this is not a limitation. For example, the controller 201 may control the displayer 30 so that it reads out from a predetermined storage device the first visual image 101 or second visual image 102 created in advance and displays the read-out first visual image 101 or second visual image 102 on the display medium.

Sixth Variation

In the above embodiment, the first switching method or second switching method has been selected to switch control according to the segment length of the road segment that the vehicle had entered and to the speed limit information about the road segment, but this is not a limitation. For example, the first switching method or second switching method may be selected according to whether a time that will be taken by the vehicle to pass through the road segment is shorter than a time setting. An example for this will be described below.

When, for example, the vehicle travelling on the first segment enters the second segment, the obtainer 10 obtains vehicle speed information, which indicates the travelling speed of the vehicle, besides the speed limit information about the second segment and the second-segment length information. Next, the determiner 202 calculates a time that will be taken by the vehicle to passes through the second segment (the time will be referred to below as the predicted passing time) according to the travelling speed indicated by the vehicle speed information and the second-segment length indicated by the second-segment length information. The determiner 202 then determines whether the calculated predicted passing time is shorter than the pre-defined time setting. If the predicted passing time is not shorter than the time setting, the controller 201 switches control in the first switching method. If the predicted passing time is shorter than the time setting, the controller 201 switches control in the second switching method, which differs from the first switching method.

As described above, by using the predicted passing time instead of a segment length, the same effect as in the first embodiment can be obtained in this variation.

This completes the description of the variations of the first embodiment in the present disclosure. The variations described above may be arbitrarily combined.

Second Embodiment

A second embodiment of the present disclosure will be described with reference to the drawings.

An example the structure of the display system 1 according to this embodiment will be described with reference to FIG. 19. FIG. 19 is a block diagram illustrating an example of the structure of the display system 1 according to this embodiment. The description below will focus only on differences from the example of the structure (for example, see FIG. 1) in the first embodiment.

The display system 1 further includes a detector 40 as, for example, a vehicle-mounted device. To detect positional information that indicates the position of the vehicle, the detector 40 performs map matching and other processing by using a GPS receiver, which receives a latitude and longitude, a gyroscope, from which azimuth information is obtained, vehicle speed information obtained from the vehicle, and map information.

The obtainer 10 obtains segment length information about a road segment and speed limit information about the road segment. In an example given here, when the vehicles enters the first segment, the obtainer 10 obtains first-segment length information indicating the first-segment length and also obtains speed limit information about the first segment, the speed limit information indicating the speed limit of the first segment. When the vehicles then enters the second segment from the first segment, the obtainer 10 obtains second-segment length information indicating the second-segment length and also obtains speed limit information about the second segment, the speed limit information indicating the speed limit of the second segment.

If the detector 40 detects that the vehicle is present on the first segment, the controller 201 controls the displayer 30 so that it creates a first predetermined image, which represents a visual image indicating the speed limit of the first segment when the first predetermined image is displayed on the display medium, and displays the first predetermined image on the display medium, according to the first-segment speed limit information obtained by the obtainer 10.

If the detector 40 detects a travel of the vehicle from the first segment to the second segment, the determiner 202 determines whether the second-segment length indicated by the second-segment length information obtained by the obtainer 10 is shorter than a pre-defined segment length setting and also determines whether the speed limit of the second segment differs from the speed limit of the first segment. The travel of the vehicle referred to here may be a travel of the vehicle in the past or may be a travel of the vehicle in the future. That is, in the detection of a travel of the vehicle, the detector 40 may detect that the vehicle has travelled a segment or may detect that the vehicle will travel a segment.

If the determiner 202 determines that the second-segment length is not shorter than the segment length setting and that the speed limit of the second segment differs from the speed limit of the first segment, the controller 201 makes a switchover, in a first switching method, from control under which the displayer 30 is caused to create the first predetermined image and display it on the display medium to control under which the displayer 30 is caused to create a second predetermined image, which represents a visual image indicating the speed limit of the second segment (the speed limit is indicated in the speed limit information, obtained by the obtainer 10, about the second segment) when the second predetermined image is displayed on the display medium, and display the second predetermined image on the display medium. A timing of the switchover referred to here may be a moment at which the vehicle enters the second segment from the first segment or may be a predetermined time before or after the vehicle enters the second segment from the first segment.

If the determiner 202 determines that the second-segment length is shorter than the segment length setting, the controller 201 makes a switchover, in a second switching method, which differs from the first switching method, from control under which the displayer 30 is caused to create the first predetermined image and display it on the display medium to control under which the displayer 30 is caused to create the second predetermined image and display it on the display medium.

Thus, the same effect as in the first embodiment can be obtained in this embodiment.

In this embodiment, the controller 201 may obtain information about a result detected by the detector 40 through the obtainer 10. In this embodiment, any combination of the variations of the first embodiment described above may be applied.

The functions of the individual constituent elements of the display system 1 and the display control device 20 described above can be implemented by computer programs.

Figure 20:
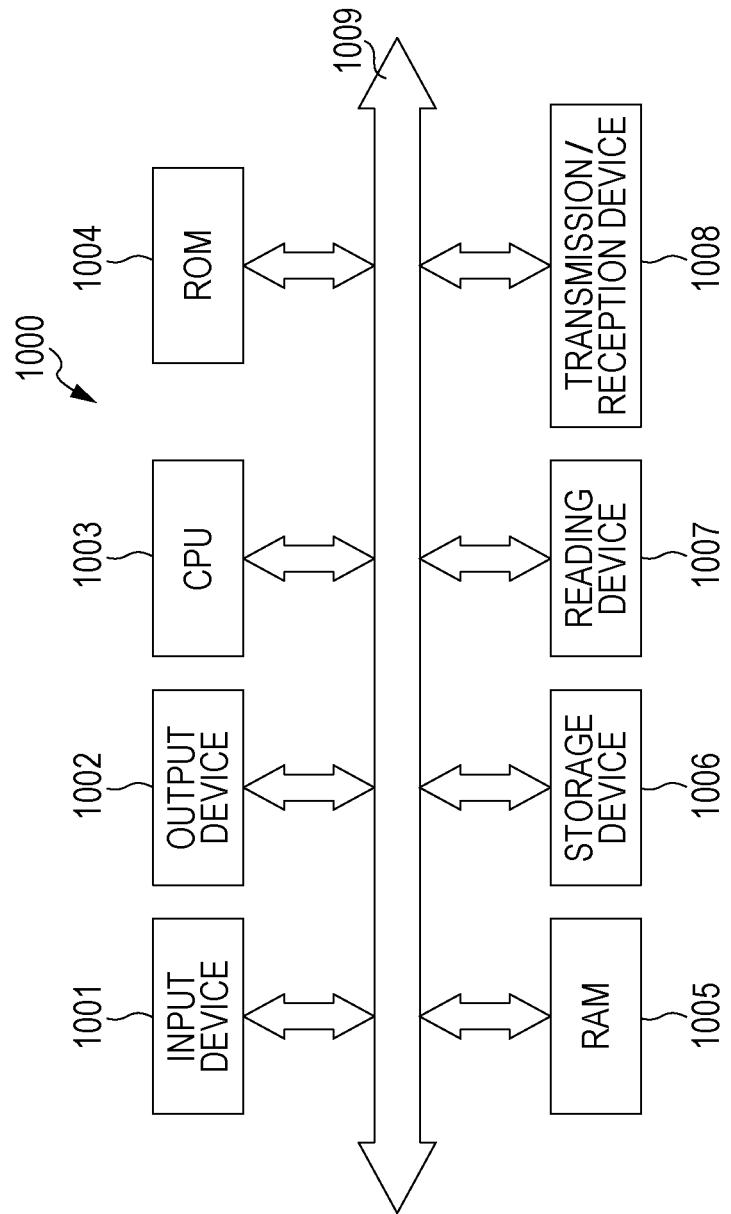
FIG. 20 is a block diagram illustrating an example of the hardware structure of the display system and display control device according to the first and second embodiments of the present disclosure.

FIG. 20 is a block diagram illustrating a hardware structure of a computer that realizes the functions of the individual constituent elements by using programs. This computer 1000 includes an input device 1001 such as an input buttons and/or a touch pad, an output device 1002 such as a display or a speaker, a central processing unit (CPU) 1003, a read-only memory (ROM) 1004, and a random-access memory (RAM) 1005. The computer 1000 also includes a storage device 1006 such as a hard disk device or a solid-state drive (SSD), a reading device 1007 that reads information from a storage medium such as a digital versatile disk read-only memory (DVD-ROM), a universal serial bus (USB) memory, or a secure digital (SD) memory card, and a transmission/reception device 1008 that performs communication over a network. These elements are mutually connected through a bus 1009.

The reading device 1007 reads out programs that realize the functions of the constituent elements described above from a storage medium on which the programs are recorded, and stores the read-out programs in the storage device 1006. Alternatively, the transmission/reception device 1008 communicates with a server apparatus connected to the network to download from the server apparatus programs that realize the functions of the constituent elements described above, and stores the downloaded program in the storage device 1006.

The CPU 1003 copies the programs stored in the storage device 1006 to the RAM 1005, sequentially reads instructions included in the programs from the RAM 1005, and executes the instructions to thereby realize the functions of the constituent elements described above. During program execution, information obtained in the various processing described above in the above first embodiment is stored in the RAM 1005 or storage device 1006, and is appropriately used.

The present disclosure is useful for a display control device, a display control method, a display control program, and a projecting device that control display of information provided to a user (for example, an occupant in a vehicle or the like or a user wearing a display device).

What is claimed is:

1. A display control device in a display system that includes an obtainer that obtains information about a segment length of a road on which a vehicle travels and information about a speed limit of the segment and also includes a displayer which creates a predetermined image according to the obtained information, and which displays the predetermined image on a display medium, the device comprising:
- a controller that controls the displayer so that the displayer creates a first predetermined image indicating the speed limit of a first segment and displays the first predetermined image on the display medium, based on the obtained information; and
- a determiner that, after the information about the speed limit of the first segment has been obtained, determines whether a segment length of a second segment is shorter than a pre-defined length, and determines whether the speed limit of a second segment differs from the speed limit of the first segment based on the obtained information, wherein
- if the determiner determines that a second-segment length, which is a segment length of a second segment, is not shorter than the pre-defined segment length and that the speed limit of the second segment differs from the speed limit of the first segment, the controller makes a switchover, in first switching method, from a first control under which the displayer is caused to create the first predetermined image and display the first predetermined image on the display medium to a second control under which the displayer is caused to create a second predetermined image, and display the second predetermined image on the display medium, and
- if the determiner determines that the second-segment length is shorter than the pre-defined length, the controller makes a switchover from the first predetermined image to the second predetermined image, in second switching method, which differs from the first switching method, from the first control to the second control.

2. The display control device according to claim 1, wherein if the determiner determines that the second-segment length is not shorter than the pre-defined length and that the speed limit of the second segment matches the speed limit of the first segment, the controller makes a switchover from the first control to the second control, in the second switching method.

3. The display control device according to claim 1, wherein:
- if the determiner determines that the second-segment length is not shorter than the pre-defined length and that the speed limit of the second segment matches the speed limit of the first segment, the controller makes a switchover, in third switching method, from the first control to the second control; and
- in the third switching method, a visual image displayed on the display medium remains unchanged before and after control is switched.

4. The display control device according to claim 1, wherein:
- if information about a third-segment length, which is a segment length of a third segment, and information about a speed limit of the third segment are obtained after a switchover has been made in the second switching method, the determiner determines whether the third-segment length is shorter than the pre-defined length;
- if the determiner determines that the third-segment length is not shorter than the pre-defined length, then the determiner determines whether the speed limit of the third segment differs from the speed limit of the first segment; and
- if the determiner determines that the third-segment length is not shorter than the pre-defined length and that the speed limit of the third segment differs from the speed limit of the first segment, the controller makes a switchover, in the first switching method, from the second control to a third control under which the displayer is caused to create a third predetermined image, which represents a visual image indicating the speed limit of the third segment when the third predetermined image is displayed on the display medium, and display the third predetermined image on the display medium.

5. The display control device according to claim 4, wherein if the determiner determines that the third-segment length is not shorter than the pre-defined length and that the speed limit of the third segment does not differ from the speed limit of the first segment, the controller makes a switchover, in the second switching method, from the second control to the third control.

6. The display control device according to claim 1, wherein:
- in the first switching method performed by the controller, after an elapse of a first time from when the controller has stopped the first control, the controller starts the second control;
- in the second switching method performed by the controller, after an elapse of a second time from when the controller has stopped the first control, the controller starts the second control; and
- the second time is zero or more but less than the first time.

7. The display control device according to claim 1, wherein:
- in the first switching method performed by the controller, after the controller has stopped control under which the displayer is caused to create the first predetermined image with a first brightness and display the first predetermined image on the display medium, the controller starts control under which the displayer is caused to create the second predetermined image with a second brightness, which differs from the first brightness, and display the second predetermined image on the display medium;
- in the second switching method performed by the controller, after the controller has stopped control under which the displayer is caused to create the first predetermined image with the first brightness and display the first predetermined image on the display medium, the controller starts control under which the displayer is caused to create the second predetermined image with a third brightness, which differs from the second brightness, and display the second predetermined image on the display medium; and
- a difference between the first brightness and the second brightness is larger than a difference between the first brightness and the third brightness.

8. The display control device according to claim 7, wherein the first brightness and the third brightness match.

9. The display control device according to claim 1, wherein:
- in the first switching method performed by the controller, after the controller has stopped control under which the displayer is caused to create the first predetermined image with a first brightness and display the first predetermined image on the display medium, the controller causes the displayer to create the second predetermined image so that a brightness of the second predetermined image is gradually increased to a second brightness, which is higher than the first brightness, in a third time and to display the second predetermined image on the display medium;

in the second switching method performed by the controller, after the controller has stopped control under which the displayer is caused to create the first predetermined image with the first brightness and display the first predetermined image on the display medium, the controller causes the displayer to create the second predetermined image so that the brightness of the second predetermined image is gradually increased to the second brightness in a fourth time and to display the second predetermined image on the display medium; and the fourth time is longer than the third time.

10. The display control device according to claim 1, wherein:

in the first switching method performed by the controller, after the controller has stopped control under which the displayer is caused to create the first predetermined image with a first brightness and display the first predetermined image on the display medium, the controller causes the displayer to create the second predetermined image so that a brightness of the second predetermined image is gradually increased to the first brightness in a fifth time and to display the second predetermined image on the display medium;

in the second switching method performed by the controller, after the controller has stopped control under which the displayer is caused to create the first predetermined image with the first brightness and display the first predetermined image on the display medium, the controller causes the displayer to create the second predetermined image so that the brightness of the second predetermined image is gradually increased to the first brightness in a sixth time and to display the second predetermined image on the display medium;

the fifth time is a predetermined time longer than 20 ms; and the sixth time is longer than the fifth time.

11. The display control device according to claim 1, wherein:

in the first switching method performed by the controller, when the controller stops control under which the displayer is caused to create the first predetermined image with a first brightness and display the first predetermined image on the display medium, the controller controls the displayer so that a brightness of the first predetermined image is gradually reduced to a predetermined brightness, which is lower than the first brightness, in a seventh time, after which the controller causes the displayer to create the second predetermined image with the first brightness and display the second predetermined image on the display medium;

in the second switching method performed by the controller, when the controller stops control under which the displayer is caused to create the first predetermined image with the first brightness and display the first predetermined image on the display medium, the controller controls the displayer so that the brightness of the first predetermined image is gradually reduced to the predetermined brightness, which is lower than the first brightness, in an eighth time, after which the controller causes the displayer to create the second predetermined image with the first brightness and display the second predetermined image on the display medium;

the seventh time is a predetermined time longer than 20 ms; and the eighth time is longer than the seventh time.

12. A display control device in a display system that includes a detector that detects positional information about a vehicle and includes a displayer which creates a predetermined image according to information about a segment length of a segment of a road and information about a speed limit of the segment and which displays the predetermined image on a display medium, the device comprising:

a controller that, if the detector detects that the vehicle is present on a first segment and information about a speed limit of the first segment is obtained, controls the displayer so that the displayer creates a first predetermined image, indicating the speed limit of the first segment when the first predetermined image is displayed on the display medium, and displays the first predetermined image on the display medium; and a determiner that, if the detector detects a travel of the vehicle from the first segment to a second segment and information about a second-segment length, which is a segment length of the second segment, and information about a speed limit of the second segment are obtained, determines whether the second-segment length is shorter than a pre-defined length, and determines whether the speed limit of the second segment differs from the speed limit of the first segment, wherein if the determiner determines that the second-segment length is not shorter than the pre-defined length and that the speed limit of the second segment differs from the speed limit of the first segment, the controller makes a switchover, in first switching method, from a first control under which the displayer is caused to create the first predetermined image and display the first predetermined image on the display medium to a second control under which the displayer is caused to create a second predetermined image, and display the second predetermined image on the display medium, and if the determiner determines that the second-segment length is shorter than the pre-defined length, the controller makes a switchover, in second switching method, which differs from the first switching method, from the first control to the second control.

13. The display control device according to claim 12, wherein if the determiner determines that the second-segment length is not shorter than the pre-defined length and if the determiner determines that the second-segment length is shorter than the pre-defined length, the controller makes the switchover when the vehicles enters the second segment from the first segment.

14. The display control device according to claim 12, wherein after an elapse of a predetermined time from when the vehicle has entered the second segment from the first segment, the controller makes the switchover to be made in a case in which the determiner determines that the second-segment length is not shorter than the pre-defined length and the switchover to be made in a case in which the determiner determines that the second-segment length is shorter than the pre-defined length.

15. A display control method in a display system that includes an obtainer that obtains information about a segment length of a segment of a road on which a vehicle travels and information about a speed limit of the segment and includes a displayer which creates a predetermined image according to the obtained information, and which displays the predetermined image on a display medium, the method comprising:

controlling, if information about a speed limit of a first segment is obtained, the displayer so that the displayer creates a first predetermined image, which represents a visual image indicating the speed limit of the first segment when the first predetermined image is displayed on the display medium, and displays the first predetermined image on the display medium; and determining, if information about a second-segment length, which is a segment length of a second segment, and information about a speed limit of the second segment are obtained after the information about the speed limit of the first segment has been obtained, whether the second-segment length is shorter than a pre-defined length, which has been pre-defined, and determining whether the speed limit of the second segment differs from the speed limit of the first segment, wherein if a determination is made that the second-segment length is not shorter than the pre-defined length and a determination is made that the speed limit of the second segment differs from the speed limit of the first segment, a switchover is made, in first switching method, from a first control under which the displayer is caused to create the first predetermined image and display the first predetermined image on the display medium to a second control under which the displayer is caused to create a second predetermined image, and display the second predetermined image on the display medium, and if a determination is made that that the second-segment length is shorter than the pre-defined length, a switchover is made, in second switching method, which differs from the first switching method, from the first control to the second control.

16. A non-transitory computer-readable recording medium storing a display control program executed by a computer in a display system that includes an obtainer that obtains information about a segment length of a segment of a road on which a vehicle travels and information about a speed limit of the segment and also includes a displayer which creates a predetermined image according to the obtained information, and which displays the predetermined image on a display medium, wherein the display control program causes the computer to perform processing in which if information about a speed limit of a first segment is obtained, the displayer is controlled so that the displayer creates a first predetermined image, indicating the speed limit of the first segment and displays the first predetermined image on the display medium based on the obtained information, processing in which if information about a second-segment length, which is a segment length of a second segment, and information about a speed limit of the second segment are obtained after the information about the speed limit of the first segment has been obtained, a first determination is made as to whether the second-segment length is shorter than a pre-defined length, which has been pre-defined, and a second determination is made as to whether the speed limit of the second segment differs from the speed limit of the first segment, processing in which if the first determination indicates that the second-segment length is not shorter than the pre-defined length and the second determination indicates that the speed limit of the second segment differs from the speed limit of the first segment, a switchover is made, in first switching method, from a first control under which the first predetermined image is created and displayed on the display medium to a second control under which a second predetermined image, and displayed on the display medium, and if the first determination indicates that that the second-segment length is shorter than the pre-defined length, a switchover is made, in second switching method, which differs from the first switching method, from the first control to the second control.

17. A projecting device in a display system that includes an obtainer that obtains information about a segment length of a segment of a road on which a vehicle travels and information about a speed limit of the segment, the device comprising:

a displayer which creates a predetermined image according to the information about the segment length and the obtained information, and which displays the predetermined image on a display medium;

a controller that, if information about a speed limit of a first segment is obtained, controls the displayer so that the displayer creates a first predetermined image, indicating the speed limit of the first segment when the first predetermined image is displayed on the display medium, and displays the first predetermined image on the display medium; and a determiner that, if information about a second-segment length, which is a segment length of a second segment, and information about a speed limit of the second segment are obtained after the information about the speed limit of the first segment has been obtained by the obtainer, determines whether the second-segment length is shorter than a pre-defined length, which has been pre-defined, and determines whether the speed limit of the second segment differs from the speed limit of the first segment; wherein if the determiner determines that the second-segment length is not shorter than the pre-defined length and that the speed limit of the second segment differs from the speed limit of the first segment, the controller makes a switchover, in first switching method, from a first control under which the displayer is caused to create the first predetermined image and display the first predetermined image on the display medium to a second control under which the displayer is caused to create a second predetermined image, and display the second predetermined image on the display medium, and if the determiner determines that the second-segment length is shorter than the pre-defined length, the controller makes a switchover, in second switching method, which differs from the first switching method, from the first control to the second control.

* * * * *